(12) United States Patent
Sikora et al.

(10) Patent No.: US 12,434,813 B2
(45) Date of Patent: Oct. 7, 2025

(54) BIDIRECTIONAL THRUST APPARATUS, SYSTEM AND METHOD

(71) Applicant: Vita Inclinata IP Holdings LLC, Broomfield, CO (US)

(72) Inventors: Derek Sikora, Denver, CO (US); Logan Goodrich, Golden, CO (US)

(73) Assignee: Vita Inclinata IP Holdings LLC, Denver, CO (US)

( * ) Notice: Subject to any disclaimer, the term of this patent is extended or adjusted under 35 U.S.C. 154(b) by 577 days.

(21) Appl. No.: 17/750,015

(22) Filed: May 20, 2022

(65) Prior Publication Data

US 2022/0274696 A1    Sep. 1, 2022

Related U.S. Application Data

(63) Continuation of application No. PCT/US2020/062425, filed on Nov. 25, 2020, and a continuation-in-part of application No. 16/988,373, filed on Aug. 7, 2020, now Pat. No. 12,258,145, which is a continuation of application No. PCT/US2019/013603, filed on Jan. 15, 2019.

(60) Provisional application No. 62/940,550, filed on Nov. 26, 2019, provisional application No. 62/757,414, (Continued)

(51) Int. Cl.
*B64D 35/04*    (2006.01)
*B64U 101/64*    (2023.01)

(52) U.S. Cl.
CPC .......... *B64D 35/04* (2013.01); *B64U 2101/64* (2023.01)

(58) Field of Classification Search
CPC ........ B64D 31/06; B64D 31/08; B64D 31/09; B64D 31/12; F04D 19/005; F04D 27/003; F04D 27/004
See application file for complete search history.

(56) References Cited

U.S. PATENT DOCUMENTS

| | | | |
|---|---|---|---|
| 1,935,283 A | 11/1933 | Adams | |
| 2,264,936 A | 12/1941 | Dorsa | |
| 2,428,656 A | 10/1947 | Elliott et al. | |

(Continued)

FOREIGN PATENT DOCUMENTS

| | | |
|---|---|---|
| EP | 0606108 A1 | 7/1994 |
| GB | 2327657 A | 2/1999 |

(Continued)

OTHER PUBLICATIONS

All pages, Written Opinion dated Apr. 30, 2020 for PCT Application No. PCT/US2020/017790, filed Feb. 11, 2020.

(Continued)

*Primary Examiner* — Brian O Peters
(74) *Attorney, Agent, or Firm* — Martin Spencer Garthwaite

(57) ABSTRACT

A bidirectional thrust assembly comprises a motor, a selective power transfer mechanism, and a plurality of fans; wherein a change in direction of rotation of the motor causes the selective power transfer mechanism to change a torque transfer among the plurality of fans, wherein the fans may be opposing, and wherein the fans may be unidirectional. The bidirectional thrust assembly may be used in or by a plurality of craft or with respect to other objects which may need to be maneuvered, included suspended load control systems, vertical takeoff and landing craft, watercraft.

17 Claims, 20 Drawing Sheets

Related U.S. Application Data filed on Nov. 8, 2018, provisional application No. 62/627,920, filed on Feb. 8, 2018.

(56) References Cited

U.S. PATENT DOCUMENTS

| | | |
|---|---|---|
| 2,651,533 A | 9/1953 | Cecil |
| 2,717,656 A | 9/1955 | Bannister |
| 3,036,797 A | 5/1962 | Domenico |
| 3,044,818 A | 7/1962 | Harry |
| 3,210,115 A | 10/1965 | Irving et al. |
| 3,265,336 A | 8/1966 | Peterson |
| 3,498,476 A | 3/1970 | Mattson et al. |
| 3,554,468 A | 1/1971 | Mcvicar |
| 3,598,440 A | 8/1971 | Ramsden et al. |
| 3,601,342 A | 8/1971 | Piasecki |
| 3,602,544 A | 8/1971 | Marsh |
| 3,656,796 A | 4/1972 | Cook |
| 3,690,602 A | 9/1972 | Marsh |
| 3,724,817 A | 4/1973 | Simons |
| 3,829,052 A | 8/1974 | Flannelly |
| 3,833,189 A | 9/1974 | Fowler et al. |
| 3,838,836 A | 10/1974 | Asseo et al. |
| 3,904,156 A | 9/1975 | Smith |
| 3,946,971 A | 3/1976 | Chadwick |
| 4,124,181 A | 11/1978 | Kolwey |
| 4,138,078 A | 2/1979 | Hester et al. |
| 4,267,987 A | 5/1981 | McDonnell |
| 4,364,704 A | 12/1982 | Dreesen et al. |
| 4,378,919 A | 4/1983 | Smith |
| 4,553,719 A | 11/1985 | Ott |
| 4,601,444 A | 7/1986 | Lindenbaum |
| 4,695,012 A | 9/1987 | Lindenbaum |
| 4,747,745 A | 5/1988 | Pippen et al. |
| 4,826,109 A | 5/1989 | Camus |
| 4,881,601 A | 11/1989 | Smith |
| 4,883,184 A | 11/1989 | Albus |
| 4,889,297 A | 12/1989 | Ikeda |
| 4,984,757 A | 1/1991 | Hartung et al. |
| 5,071,184 A | 12/1991 | Dessaux |
| 5,071,573 A | 12/1991 | Coffindaffer et al. |
| 5,125,707 A | 6/1992 | Chaen et al. |
| 5,131,491 A | 7/1992 | Varner et al. |
| 5,143,326 A | 9/1992 | Parks |
| 5,190,250 A | 3/1993 | DeLong et al. |
| 5,249,652 A | 10/1993 | Leitzman et al. |
| 5,273,333 A | 12/1993 | Hatfield et al. |
| 5,299,845 A | 4/1994 | Gabriel |
| 5,344,203 A | 9/1994 | Tollenaere |
| 5,352,056 A | 10/1994 | Chandler |
| 5,358,219 A | 10/1994 | Shenk et al. |
| 5,396,815 A | 3/1995 | Polites et al. |
| 5,443,566 A | 8/1995 | Rushmer et al. |
| 5,451,032 A | 9/1995 | Rhoads |
| 5,465,925 A | 11/1995 | Connolly et al. |
| 5,499,785 A | 3/1996 | Roberts et al. |
| 5,518,205 A | 5/1996 | Wurst et al. |
| 5,524,870 A | 6/1996 | Tallent et al. |
| 5,562,394 A | 10/1996 | Brown, Jr. |
| 5,593,113 A | 1/1997 | Cox |
| 5,613,722 A | 3/1997 | Fandrich et al. |
| 5,816,098 A | 10/1998 | Kanki et al. |
| 5,816,636 A | 10/1998 | Gibson et al. |
| 5,871,249 A | 2/1999 | Williams |
| 5,898,746 A | 4/1999 | Baversten et al. |
| 5,927,438 A | 7/1999 | Ostrobrod |
| 5,961,563 A | 10/1999 | Overton |
| 6,189,834 B1 | 2/2001 | Dietz et al. |
| 6,199,793 B1 | 3/2001 | Hainsworth et al. |
| 6,439,407 B1 | 8/2002 | Jacoff et al. |
| 6,533,220 B2 | 3/2003 | Schuster |
| D473,482 S | 4/2003 | Felmingham |
| 6,578,796 B2 | 6/2003 | Maeda |
| 6,708,926 B2 | 3/2004 | Bonisch |
| 6,814,185 B1 | 11/2004 | Ostrobrod |
| 6,983,833 B2 | 1/2006 | Ivers et al. |
| 7,028,351 B1 | 4/2006 | Frieder et al. |
| 7,131,515 B2 | 11/2006 | Gartsbeyn et al. |
| 7,267,240 B2 | 9/2007 | Maurer et al. |
| 7,720,582 B2 | 5/2010 | Makinadjian |
| D617,293 S | 6/2010 | Yoshihashi |
| 7,887,011 B1 | 2/2011 | Baldwin |
| 7,948,237 B2 | 5/2011 | Kuzmin et al. |
| 8,131,384 B2 | 3/2012 | Karpman et al. |
| 8,157,205 B2 | 4/2012 | McWhirk |
| 8,226,042 B1 | 7/2012 | Howell et al. |
| 8,231,083 B2 | 7/2012 | Kutzmann et al. |
| 8,292,229 B2 | 10/2012 | Pancotti et al. |
| D671,293 S | 11/2012 | Fredriksson |
| 8,413,923 B2 | 4/2013 | Brenner et al. |
| 8,496,279 B2 | 7/2013 | Aoki |
| 8,534,607 B2 | 9/2013 | Tardiff et al. |
| 8,534,608 B1 | 9/2013 | Cox, IV |
| 8,591,161 B1 | 11/2013 | Bernhardt |
| 8,840,355 B1 | 9/2014 | Kulesha |
| 8,886,402 B1 | 11/2014 | Lou |
| 8,888,048 B2 | 11/2014 | Figoureux et al. |
| 8,894,050 B2 | 11/2014 | Wootten et al. |
| 8,899,903 B1 | 12/2014 | Saad et al. |
| 8,903,568 B1 | 12/2014 | Wang et al. |
| 8,925,901 B2 | 1/2015 | Gaillard |
| 8,938,325 B1 | 1/2015 | McGinnis et al. |
| 8,967,533 B2 | 3/2015 | DeVaul et al. |
| 9,027,976 B1 | 5/2015 | Tollenaere |
| 9,096,294 B1 | 8/2015 | Dong et al. |
| 9,114,871 B2 | 8/2015 | Woodworth et al. |
| 9,194,977 B1 | 11/2015 | Dungan et al. |
| 9,205,922 B1 | 12/2015 | Bouwer |
| 9,223,008 B1 | 12/2015 | Hartman et al. |
| 9,242,741 B1 | 1/2016 | Cockell |
| 9,302,770 B2 | 4/2016 | Burgess et al. |
| 9,375,841 B1 | 6/2016 | Kemper |
| 9,422,139 B1 | 8/2016 | Bialkowski et al. |
| 9,676,481 B1 | 6/2017 | Buchmueller |
| 9,688,404 B1 | 6/2017 | Buchmueller et al. |
| 9,797,723 B1 | 10/2017 | Huang |
| 9,800,091 B2 | 10/2017 | Nugent, Jr. et al. |
| 9,836,063 B1 | 12/2017 | Bonawitz et al. |
| 9,849,981 B1 | 12/2017 | Burgess et al. |
| 9,850,113 B2 | 12/2017 | Melin et al. |
| 9,881,506 B1 | 1/2018 | Gentry |
| 9,908,756 B2 | 3/2018 | Heravi et al. |
| 9,958,876 B2 | 5/2018 | Lind et al. |
| 10,023,312 B2 | 7/2018 | Repp et al. |
| 10,023,313 B2 | 7/2018 | Behrens et al. |
| 10,071,804 B1 | 9/2018 | Buchmueller et al. |
| 10,112,805 B1 | 10/2018 | Joralmon |
| 10,286,943 B1 | 5/2019 | Greenblatt et al. |
| 10,288,075 B2 | 5/2019 | Ishiba |
| 10,451,504 B2 | 10/2019 | Campbell et al. |
| 10,479,503 B2 | 11/2019 | Sikora et al. |
| 10,519,013 B2 | 12/2019 | Curran et al. |
| 10,676,190 B2 | 6/2020 | Mitchell et al. |
| 10,870,558 B2 | 12/2020 | Sikora et al. |
| 10,899,586 B2 | 1/2021 | Cranney, III |
| 10,918,892 B2 | 2/2021 | Dickson |
| 10,940,061 B2 | 3/2021 | Sikora et al. |
| 10,960,976 B2 | 3/2021 | Bosma et al. |
| 11,008,198 B2 | 5/2021 | Sikora et al. |
| 11,142,316 B2 | 10/2021 | Sikora et al. |
| 11,142,433 B2 | 10/2021 | Sikora et al. |
| 11,209,836 B1 | 12/2021 | Sikora et al. |
| 11,339,034 B2 | 5/2022 | Sikora et al. |
| 11,370,642 B2 | 6/2022 | Markwell |
| 11,535,496 B2 | 12/2022 | Al-Husseini et al. |
| 2002/0113448 A1 | 8/2002 | Kazerooni et al. |
| 2003/0085319 A1 | 5/2003 | Wagner et al. |
| 2003/0121024 A1 | 6/2003 | Hill et al. |
| 2003/0220177 A1 | 11/2003 | Orlando |
| 2004/0026349 A1 | 2/2004 | Colgate et al. |
| 2004/0032140 A1 | 2/2004 | Solstad |
| 2005/0072965 A1 | 4/2005 | Sanders et al. |
| 2005/0242237 A1 | 11/2005 | Scott |
| 2006/0163892 A1 | 7/2006 | Nguyen et al. |
| 2007/0200032 A1 | 8/2007 | Eadie et al. |

(56) References Cited

U.S. PATENT DOCUMENTS

| | | |
|---|---|---|
| 2008/0027586 A1 | 1/2008 | Baek et al. |
| 2008/0272566 A1 | 11/2008 | Thompson |
| 2009/0004004 A1 | 1/2009 | Vincenzi |
| 2009/0152391 A1 | 6/2009 | McWhirk |
| 2009/0200428 A1 | 8/2009 | Smith et al. |
| 2010/0000349 A1 | 1/2010 | Stevens et al. |
| 2010/0012771 A1 | 1/2010 | Jess |
| 2010/0176618 A1 | 7/2010 | Souke et al. |
| 2010/0237183 A1 | 9/2010 | Wilson et al. |
| 2010/0291707 A1 | 11/2010 | Mirkin et al. |
| 2010/0319910 A1 | 12/2010 | Ives et al. |
| 2011/0168514 A1 | 7/2011 | Lee |
| 2011/0192932 A1 | 8/2011 | Brenner et al. |
| 2012/0006779 A1 | 1/2012 | Mills et al. |
| 2012/0145832 A1 | 6/2012 | Schuster |
| 2012/0150364 A1 | 6/2012 | Tillotson et al. |
| 2012/0271582 A1 | 10/2012 | Bageshwar et al. |
| 2012/0292434 A1 | 11/2012 | Welsh |
| 2012/0293177 A1 | 11/2012 | Dodds |
| 2013/0054054 A1 | 2/2013 | Tollenaere et al. |
| 2013/0056586 A1 | 3/2013 | Occhiato et al. |
| 2013/0081245 A1 | 4/2013 | Vavrina et al. |
| 2013/0270393 A1 | 10/2013 | Shrapnel |
| 2013/0299634 A1 | 11/2013 | Haggard |
| 2014/0154965 A1 | 6/2014 | Han et al. |
| 2014/0224755 A1 | 8/2014 | Eriksson et al. |
| 2014/0252170 A1 | 9/2014 | Prud'Homme-Lacroix |
| 2014/0333232 A1 | 11/2014 | Verheyen |
| 2015/0041598 A1 | 2/2015 | Nugent et al. |
| 2015/0151837 A1 | 6/2015 | Sane et al. |
| 2015/0360779 A1 | 12/2015 | Behrens et al. |
| 2016/0009393 A1 | 1/2016 | Repp et al. |
| 2016/0009531 A1 | 1/2016 | Saliba et al. |
| 2016/0031683 A1 | 2/2016 | Fenker et al. |
| 2016/0048131 A1 | 2/2016 | Lesperance et al. |
| 2016/0236779 A1 | 8/2016 | Thomas et al. |
| 2016/0240417 A1 | 8/2016 | Tomida |
| 2016/0297650 A1 | 10/2016 | Bang |
| 2016/0298962 A1 | 10/2016 | Lee |
| 2016/0332728 A1 | 11/2016 | Winfree et al. |
| 2016/0340030 A1 | 11/2016 | Roussey et al. |
| 2016/0340035 A1 | 11/2016 | Duru |
| 2016/0340039 A1 | 11/2016 | Waltner et al. |
| 2017/0009859 A1 | 1/2017 | Sevagen |
| 2017/0052676 A1 | 2/2017 | Pulier et al. |
| 2017/0073055 A1 | 3/2017 | Song |
| 2017/0088261 A1 | 3/2017 | Sequeira et al. |
| 2017/0129749 A1 | 5/2017 | Mijangos et al. |
| 2017/0138737 A1 | 5/2017 | Cordova et al. |
| 2017/0197718 A1 | 7/2017 | Buchmueller |
| 2017/0217566 A1 | 8/2017 | Ichinose |
| 2017/0276139 A1 | 9/2017 | Ishiba |
| 2017/0284795 A1 | 10/2017 | Carlson et al. |
| 2017/0291707 A1 | 10/2017 | Veronesi et al. |
| 2018/0057318 A1 | 3/2018 | Benton et al. |
| 2018/0072404 A1 | 3/2018 | Prager et al. |
| 2018/0099748 A1 | 4/2018 | Lesperance et al. |
| 2018/0208309 A1 | 7/2018 | Wang |
| 2018/0229855 A1 | 8/2018 | Sane et al. |
| 2018/0251346 A1 | 9/2018 | Thomson et al. |
| 2018/0252616 A1 | 9/2018 | Bryson et al. |
| 2018/0282130 A1 | 10/2018 | Kale et al. |
| 2018/0339891 A1 | 11/2018 | Ijadi-Maghsoodi et al. |
| 2019/0016480 A1 | 1/2019 | Kashiwa et al. |
| 2019/0031474 A1 | 1/2019 | Stilborn et al. |
| 2019/0033892 A1 | 1/2019 | Gomez et al. |
| 2019/0055111 A1 | 2/2019 | Cranney, III |
| 2019/0193827 A1 | 6/2019 | Zerweckh |
| 2019/0236370 A1 | 8/2019 | Man |
| 2019/0241267 A1 | 8/2019 | Sikora et al. |
| 2019/0337776 A1 | 11/2019 | Fanello et al. |
| 2020/0087121 A1 | 3/2020 | Ohayon et al. |
| 2020/0165010 A1 | 5/2020 | Sun et al. |
| 2020/0180763 A1 | 6/2020 | Schütz et al. |
| 2020/0182252 A1 | 6/2020 | Nakasuji et al. |
| 2020/0210704 A1 | 7/2020 | Han et al. |
| 2020/0222257 A1 | 7/2020 | Sikora et al. |
| 2020/0231415 A1 | 7/2020 | Sikora et al. |
| 2020/0271270 A1 | 8/2020 | Sikora et al. |
| 2020/0331601 A1* | 10/2020 | Sabie ................ B64U 10/20 |
| 2020/0369492 A1 | 11/2020 | Sikora et al. |
| 2020/0400330 A1 | 12/2020 | Przybylski et al. |
| 2021/0371250 A1 | 12/2021 | Bedgood et al. |
| 2021/0371252 A1 | 12/2021 | Sikora et al. |
| 2022/0121225 A1 | 4/2022 | Sikora et al. |
| 2022/0135378 A1 | 5/2022 | Sikora et al. |
| 2022/0274696 A1 | 9/2022 | Sikora et al. |
| 2022/0274809 A1 | 9/2022 | Sikora et al. |
| 2022/0277472 A1 | 9/2022 | Birchfield et al. |
| 2022/0281721 A1 | 9/2022 | Sikora et al. |
| 2022/0371736 A1 | 11/2022 | Sikora et al. |
| 2023/0117935 A1 | 4/2023 | Al-Husseini et al. |

FOREIGN PATENT DOCUMENTS

| | | |
|---|---|---|
| GB | 2457149 A | 8/2009 |
| GB | 2513646 A | 11/2014 |
| JP | H04256686 A | 9/1992 |
| JP | H0543184 A | 2/1993 |
| JP | H05193584 A | 8/1993 |
| JP | H07179288 A | 7/1995 |
| JP | 08312588 A | 11/1996 |
| JP | H09317795 A | 12/1997 |
| JP | 10032961 | 2/1998 |
| JP | H10305989 A | 11/1998 |
| JP | H1111859 A | 1/1999 |
| JP | 11037093 A | 2/1999 |
| JP | 2016210607 A | 12/2016 |
| JP | 2017500257 A | 1/2017 |
| JP | 2018140860 A | 9/2018 |
| JP | 2019023143 A | 2/2019 |
| JP | 6554258 B1 | 7/2019 |
| WO | 2011012915 A1 | 2/2011 |
| WO | 2014076189 A1 | 5/2014 |
| WO | 2018090104 A1 | 5/2018 |
| WO | 2018234670 A1 | 12/2018 |
| WO | 20171181 A1 | 1/2019 |

OTHER PUBLICATIONS

Extended European Search Report and Search Opinion, Application No. EP 19 751 097.7, mailed Aug. 31, 2021, 15 pages.
Internal Search Report mailed Apr. 30, 2020 for PCT/US2020/017790, filed Feb. 11, 2020.
International Search Report dated Apr. 3, 2019, for PCT/US19/13603 filed Jan. 15, 2019.
International Search Report in PCT/US2020/062414, mailed Feb. 19, 2021, entire document.
International Search Report mailed May 27, 2020 for PCT.US20/19967 filed Feb. 26, 2020.
International Search Report mailed Oct. 6, 2020, for PCT/US2020/042936, filed Jul. 2020.
Phillip J. McKerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.
Written Opinion in PCT/US2020/062414, mailed Feb. 19, 2021, entire document.
Written Opinion mailed Apr. 3, 2019, for PCT/US19/13603, filed Jan. 15, 2019.
Written Opinion mailed May 27, 2020, for PCT/US20/19967, filed Feb. 26, 2020.
Written Opinion mailed Oct. 6, 2020 for PCT/US2020/042936 filed Jul. 21, 2020.
Young, L.A , "Enhanced Rescue Lift Capability", 63rd Annual Forum of the AHS international, Virginia Beach, VA, May 1-3, 2007 (May 2007). FIG.2,5,12,16, Abstract pp. 6-12.

* cited by examiner

BIDIRECTIONAL THRUST APPARATUS, SYSTEM AND METHOD

CROSS-REFERENCE TO RELATED APPLICATIONS

This application is a continuation of incorporates by reference and claims the benefit of Patent Cooperation Treaty patent application number PCT/US20/62425, filed Nov. 25, 2020, titled, "BIDIRECTIONAL THRUST APPARATUS, SYSTEM, AND METHOD"; PCT/US20/62425 is a non-provisional of and claims the benefit of and incorporates by reference U.S. provisional patent application 62/940,550, filed Nov. 26, 2019, and titled, "BIDIRECTIONAL FAN"; this application further is a continuation-in-part of, incorporates by this reference, and claims the benefit of U.S. patent application Ser. No. 16/988,373, filed Aug. 7, 2020, titled, "SUSPENDED LOAD STABILITY SYSTEMS AND METHODS"; Ser. No. 16/988,373 is a continuation of Patent Cooperation Treaty patent application number PCT/US19/13603, filed Jan. 15, 2019, titled, "SUSPENDED LOAD STABILITY SYSTEMS AND METHODS"; Ser. No. 16/988,373 claims the benefit of and incorporates by reference U.S. provisional patent application 62/627,920, filed Feb. 8, 2018 and titled "SUSPENDED LOAD STABILITY SYSTEM THROUGH SELF POWERED AUTOMATED ELECTRIC DUCT FAN CONTROL", and U.S. provisional patent application No. 62/757,414, filed on Nov. 8, 2018, titled "LOAD STABILITY SYSTEM FOR SUSPENDED LOAD CHAOTIC MOTION; PCT/US19/13603 claims the benefit of and incorporates by reference U.S. provisional patent application 62/627,920, filed Feb. 8, 2018 and titled "SUSPENDED LOAD STABILITY SYSTEM THROUGH SELF POWERED AUTOMATED ELECTRIC DUCT FAN CONTROL", and U.S. provisional patent application No. 62/757,414, filed on Nov. 8, 2018, titled "LOAD STABILITY SYSTEM FOR SUSPENDED LOAD CHAOTIC MOTION.

FIELD

This disclosure is directed to improved apparatus(es), system(s), and method(s) for and related to a fan assembly comprising two fans and one motor; the fans may be unidirectional and arranged in opposing directions; the fan assembly may be used, for example, to control a load suspended on a suspension cable below a carrier.

BACKGROUND

An airfoil is a cross-sectional shape of, for example, a wing, blade, fin, or sail. An airfoil-shaped body moving through a fluid (e.g. air or water) may produce a force on the body, such as lift, thrust, and or drag. Hereinafter, airfoil(s) radially arrayed in one structure around an axis of rotation, e.g. as in a propeller, may be referred to as a "fan".

A fan may rotate about its axis of rotation in two directions, e.g. clockwise and counterclockwise. Fans may be designed to rotate in either direction, with equal thrust produced in either direction; e.g. a fan with symmetric airfoils may produce equal thrust when rotated in either direction. Such fans may be referred to herein as "bidirectional fans". In comparison to a bidirectional fan, alternatively, a fan may be designed to provide greater thrust, greater lift, reduced drag, or noise when rotated in one direction. Such fans are referred to herein as unidirectional fans. Unidirectional fans may have blades with asymmetric airfoils.

Unidirectional fans are widely understood to be more efficient than bidirectional fans at converting work from a motor into acceleration of thrust fluid, wherein acceleration of thrust fluid provides lift or thrust or otherwise performs work. When the lift or thrust has a direction, it may be referred to as a thrust vector.

There are contexts in which it is desirable for a system to output different thrust vectors; the desired thrust vectors may be opposing, such as 180 degrees apart. For example, many boat propellers may be operated in a first direction to provide a forward thrust vector (relative to the bow of the boat) or in a second direction to provide a reverse thrust vector. However, and as noted, if the propeller/fan is unidirectional, operation of the propeller will be less efficient in one of the directions; if the propeller is bidirectional, it will be equally efficient in both directions, but if the propeller is operated predominantly in one direction, it will be less efficient overall than a unidirectional propeller.

An alternative to using a single bidirectional fan in such contexts is to use two unidirectional fans driven by two separate motors. However, two motors may add to system weight and complexity, either or both of which may negatively affect overall system efficiency.

A context in which it is desirable for a system or apparatus to output opposing thrust vectors occurs when people and/or equipment ("loads") are transported to or from a location as a load suspended by a cable from a helicopter, airplane, or crane, using a hoist system. Cranes, helicopters, fixed wing aircraft, and other structures capable of carrying a load with a hoist system may be referred to herein as "carriers". During such operations, loads are subject to winds and other external and internal factors that may cause the load to move in an unstable, undesirable, or hazardous manner. During such operations, it may be desirable to move the load to a location other than its lowest energy hung position below the carrier. During such operations, it may be desirable to use a system which outputs variable thrust from one or more thrust vector sources, wherein the thrust vector sources may have a fixed geometric relationship with one another. In such operations, a plurality of the thrust vector sources may oppose one another, operating on a principal of "vectored thrust control".

In hoist, sling, and other carrier operations, observed motion of suspended loads includes the following components: vertical translation (motion up and down) along the Y axis (referred to herein as "vertical translation"); horizontal translation along either or both the X and Z axis; and rotation or "yaw" about the Y axis. Roll (rotation about the X axis) and pitch (rotation about the Y axis) may also occur, though if a load is suspended by a cable and is not buoyant, the typical motions are vertical translation, horizontal translation, and yaw. Vertical and horizontal translation may be caused by movement of a suspension cable, such as by movement of the carrier, pulling in or paying out the suspension cable, movement of the load, differences in momentum between the load and the carrier, as well as by wind—including propeller wash—impacts, and external forces. Horizontal translation can manifest as lateral motion or as or conical pendulum motion of the load, with the pivot point of the pendulum being where the cable is secured to the carrier ("pendular motion"); pendular motion generally also includes a component of vertical translation, because the load swings up and down as well as back and forth.

Yaw, lateral motion, and pendular motion can complicate lift operations, cause delays, and can lead to death or injury of aircrew, crane operators, and of people on the ground. Yaw can produce dizziness and disorientation in humans. Yaw and lateral and pendular motion can also interfere with bringing a load into or delivering a load to a location. For example, delivery of a load to a deck of a ship may be significantly complicated by pendular motion or yaw of the load, even if the deck is stable and is not also subject to heave, roll, or pitch, as it may be. For example, bringing a person in a litter into a helicopter or onto a helicopter strut may be hazardous if the litter is undergoing yaw or pendular motion as it is drawn up to the helicopter. One or more components of undesired motion of the load may accelerate or grow more pronounced as a load is drawn up to the carrier and the suspension cable shortens. Horizontal and pendular motion of a load can also interact with the carrier to produce dangerous or undesired reactive or sympathetic motion in the carrier.

In addition, some suspended load operations may involve an obstacle, such as a surface, cliff wall, building, bridge, tree limb, overhang, narrow passage or other obstacle that may interfere with one or more of carrier, load, and/or suspension cable. It may be desirable to move the load relative to such an obstacle, or for other reasons, in a manner which does not involve the load hanging at a lowest energy position below the carrier.

Other operations, such as those utilizing drones or marine vessels, may also utilize fans and motors to control motion. Drones typically have propellers located above them for lift and may also benefit from maneuvering laterally in tight spaces. Ships often use transverse propulsion devices, such as bow thrusters or stern thrusters, to direct the bow or stern of a vessel in a different direction from the main propulsion thrusters of the vessel. These devices are often referred to as tunnel thrusters and may have one or more propellers driven by small reversible electric motors to provide thrust in either direction. However, these devices may have a motor and fan for each direction or use a single motor and single bidirectional fan. Use of additional motors may result in additional system weight; use of bidirectional fans may be less efficient.

Performance of a system which need to maneuver may be limited by the magnitude of thrust vectors which the system's fans can output, the speed at which the thrust vectors can switch directions, and efficiency of the system in converting scarce and expensive battery power into such thrust vectors. These factors create an incentive to use unidirectional fans, each with its own motor. However, multiple motors may add to weight and system complexity.

Therefore, there is a need to reduce the power consumption, size, and weight of maneuvering devices while still outputting a maximum force vector with available power.

DETAILED DESCRIPTION

Figure 1:
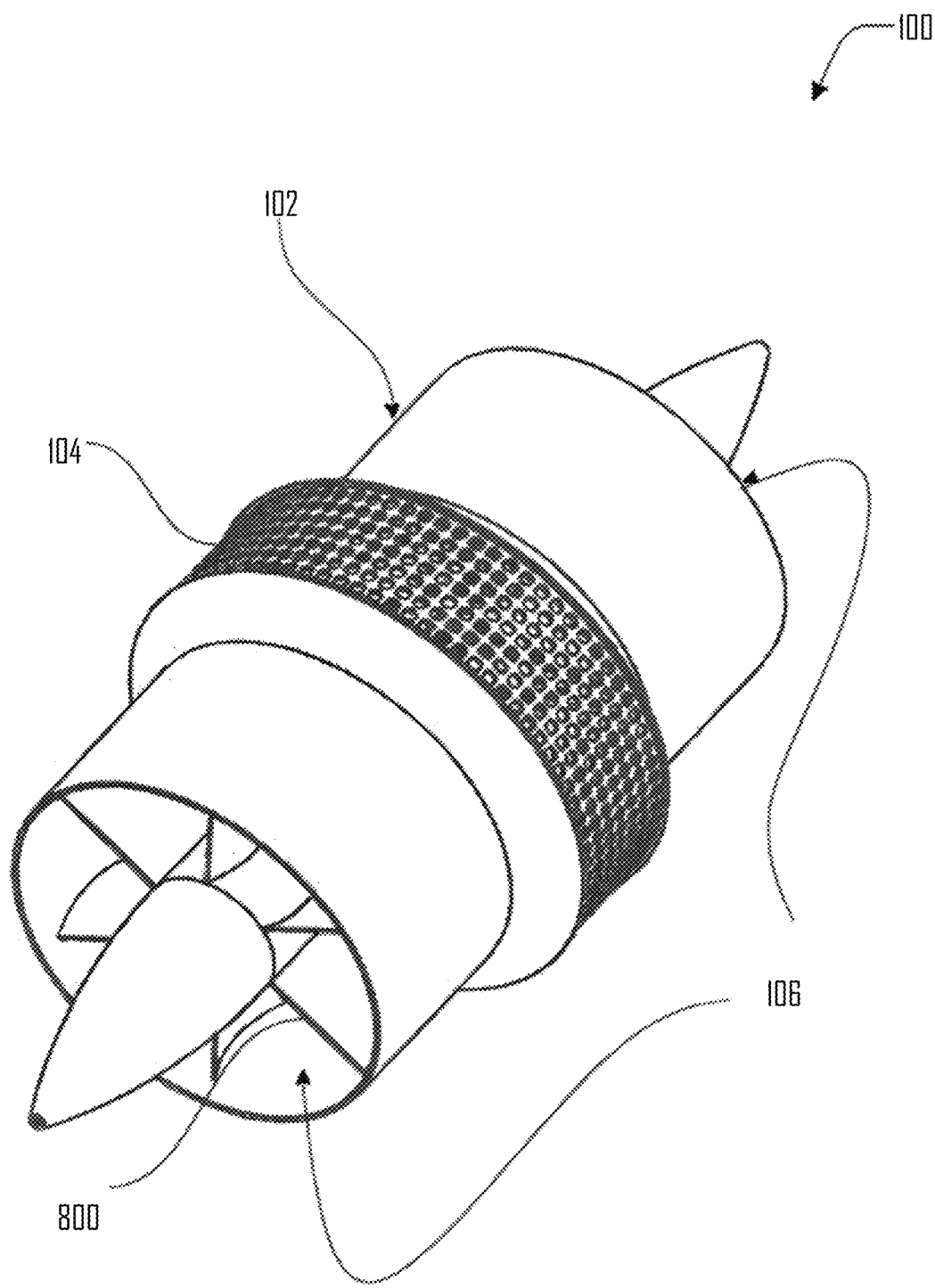
FIG. 1 illustrates a bidirectional thrust assembly, in accordance with an embodiment.

A single bidirectional fan and a single motor may be used to provide bidirectional thrust along opposing thrust vectors though with less efficiency when compared to two unidirectional fans, each with its own motor. However, use of two motors to provide power to two unidirectional fans increases weight, system complexity, and requires more physical space, compared to the single bidirectional fan and single motor.

This disclosure addresses these problems and relates to a bidirectional thrust assembly that may provide thrust needed for successful device maneuvering using a single motor to drive two unidirectional fans in either rotational direction, instead of requiring a motor for each fan. In this way, the disclosed assembly may provide a more compact solution and draw less power than a system comprising, for example, one motor and one bidirectional fan or two motors and two unidirectional fans, thus prolonging battery life of maneuvering systems incorporating the bidirectional thrust assembly disclosed herein.

An example of a context which may benefit from a bidirectional thrust assembly, as disclosed herein, is a suspended load control system. The suspended load control system or load stability system (referred to together as, "SLCS") may control a load, independent from a carrier, by outputting force vectors from thrusters, fans, or propellers, as are found in electric ducted fans at, or near, the location of the load. Thrusters, fans, propellers and electric ducted fans may be referred to herein as "EDFs" and or as "fans". The EFSs in an SLCS may comprise opposing pairs of fans. Force vectors produced by EDFs may be used to counteract yaw and pendular motion, may be used to translate a load horizontally, such as to avoid an obstacle or to move a load into an offset position relative to a normal lowest-energy hanging position, or may otherwise be used to control the fine location and yaw of a load, independently from the carrier. Consequently, an SLCS may enhance mission safety and improve performance of carrier and load operations as the SLCS dynamically controls fine location and yaw of a load, separate from motion of the carrier.

An SLCS may consume a great deal of power; power for an SLCS may be provided by a battery pack. Limited power in a battery pack may limit missions and operational effectiveness of an SLCS. In addition, an SLCS may benefit from or require rapid change in force vectors. In addition, an SLCS may also benefit from or require great efficiency in production of force vectors. In addition, an SLCS may also benefit from or require light weight, because the carrier transporting an SLCS and load may have limited lifting capacity.

Vertical takeoff and landing (VTOL) and lighter-than-air aircraft may also benefit from thrusters capable of outputting opposing thrust vectors, such as to maneuver laterally while in transit or for stabilization during takeoff and landing. VTOL configurations may be found in vehicles ranging from drones to passenger and cargo craft, such as fixed-wing aircraft, helicopters, rockets, cyclocoptors, tiltrotors, etc. Lighter-than-air craft may include blimps, hot air balloons, and similar vehicles. These craft may use fans and motors to provide lateral thrust and may also benefit from thruster systems capable of outputting opposing thrust vectors.

While downward thrust or buoyancy may provide lift that raises VTOL and lighter-than-air craft off the ground, additional thruster(s) may be needed to provide a lateral force in order to direct such aircraft along a desired course or to provide a torque to cause the aircraft to yaw. Fan and motor configurations may be used to impart this steering and motive force, though use of multiple motors powering multiple unidirectional motors adds weight, system complexity, and requires space on such aircraft. Such aircraft craft may benefit from enhanced agility imparted by lightweight, small-footprint, low-power bidirectional thruster system disclosed herein.

The disclosed systems and methods may be used in any operations requiring at least a portion of an object to be maneuvered. Exemplary operations may include hoist operations, drone delivery systems, and tunnel thrusters on marine vessels, but are not limited thereto. Accordingly, the medium in which the system operates may be any fluid, such as air or water, but is not limited thereto; the fluid may be referred to as "thrust fluid". For example, any references to fluid inlet may be replaced by air inlet or visa versa. The systems and methods in the examples below may be adapted to other uses by one of skill the art without undue experimentation or burden.

A bidirectional thrust assembly may comprise a motor, a selective power transfer mechanism, and a plurality of unidirectional fans.

The motor may comprise a double ended driveshaft; the motor may be configured to rotate the double ended driveshaft in either a clockwise direction or a counterclockwise direction.

The selective power transfer mechanism may comprise, for example, a plurality of freewheel assemblies, a plurality of clutch assemblies, and or a bi-directional drivetrain. The plurality of freewheel assemblies may each comprise a pawl wheel and a ratchet wheel. The pawl wheel may include a pawl and a pawl engagement mechanism to engage the pawl with the ratchet wheel. The ratchet wheel may include a tooth along an internal diameter of a hub of the ratchet wheel, wherein the tooth is configured to allow the pawl to engage with the tooth in only one direction. The selective power transfer mechanism may comprise a first freewheel assembly between a first end of the double ended driveshaft and a first fan and a second freewheel assembly between a second end of the double ended driveshaft and a second fan. The first freewheel assembly may be configured to transfer power, such as torque, from the motor to the first fan when the motor is driven in a first direction (e.g. clockwise); the second freewheel assembly may be configured to transfer torque from the motor to the second fan when the motor is driven in a second direction (e.g. counterclockwise). In this manner, the selective power transfer mechanism may selectively provide power to either the first fan or the second fan, based on a direction of rotation of the motor.

A stator of a bidirectional thrust assembly may be present downstream of fans. The stator may comprise a plurality of fixed fins configured to direct or augment thrust generated by fans.

A case of or containing a bidirectional thrust assembly may comprise a thrust fluid inlet and two output ports. The motor, selective power transfer mechanism, and fans of the bidirectional thrust assembly may be within the case. Each fan may be located proximate to or within an output port.

In an embodiment, each case may comprise a meshed or screened thrust fluid inlet positioned at or near the center portion of the bidirectional thrust assembly. Although a central meshed thrust fluid inlet configuration is illustrated in the figures by way of example, any opening which allows thrust fluid to flow to the fans may be used.

The bidirectional thrust assembly may be controlled by a controller. In an embodiment, a circuit, module, algorithm in embodied in software, or other system ("thrust control module") may control the bidirectional thrust assembly to control a direction of thrust output by the bidirectional thrust assembly (e.g. to control an output thrust vector) and a magnitude of a thrust vector output by a fan of the bidirectional thrust assembly. One or more bidirectional thrust assemblies may be used by the thrust control module to output lateral force or torque and to thereby control a load, such as to stabilize a load, control the path of a load, maneuver a craft, or the like. Examples of bidirectional thrust assemblies incorporated into SLCS are illustrated and discussed in relation to FIG. 16, FIG. 17, and FIG. 18. An example of a remote pendant, which may be used to provide input to a thrust control module, is illustrated and discussed in relation to FIG. 12. An example of logical components to implement a thrust control module and or a remote pendant is illustrated and discussed in FIG. 13. Examples of thrust control modules are illustrated and discussed in relation to FIG. 14 and FIG. 15.

In an embodiment comprising a motor with a double ended driveshaft with fans on both ends of the double ended driveshaft, the motor may be caused to rotate in either direction; the selective power transfer mechanism may cause the fans to produce thrust vectors depending upon the direction of rotation of the motor.

In an embodiment, a bidirectional thrust assembly may comprise a brake to prevent a first fan from rotating, such as when a second fan receives power from the motor. In an embodiment, the brake may be a frictionless brake comprising magnets, as discussed in relation to FIG. 9 and FIG. 10. A brake may allow a bidirectional thrust assembly to change a thrust vector more rapidly, may allow a bidirectional thrust assembly to operate more efficiently, and may stabilize flow of thrust fluid through a bidirectional thrust assembly.

FIG. 1 illustrates bidirectional thrust assembly 100 in accordance with an embodiment. Some or all components of bidirectional thrust assembly 100 may be contained within case 102. Case 102 may include fluid inlet 104 and two inline output ports 106.

Fluid inlet 104 may be located around a circumference of the case 102 and substantially midway along a length of case 102. Fluid inlet 104 may be protected by a mesh, or other types of openings, to prevent objects from entering the case and damaging or inhibiting function of the bidirectional thrust assembly 100. The profile of case 102 may be designed to maximize flow of thrust fluid while also directing the thrust fluid toward fans.

At each end of case 102, and along a line defined by a rotational axis of the fans, case 102 may comprise output ports 106. Case 102 may have structures to mount a motor in an axially and radially central position and for mounting stator 800. Stator(s) 800 may be located within output port(s) 106.

Figure 2:
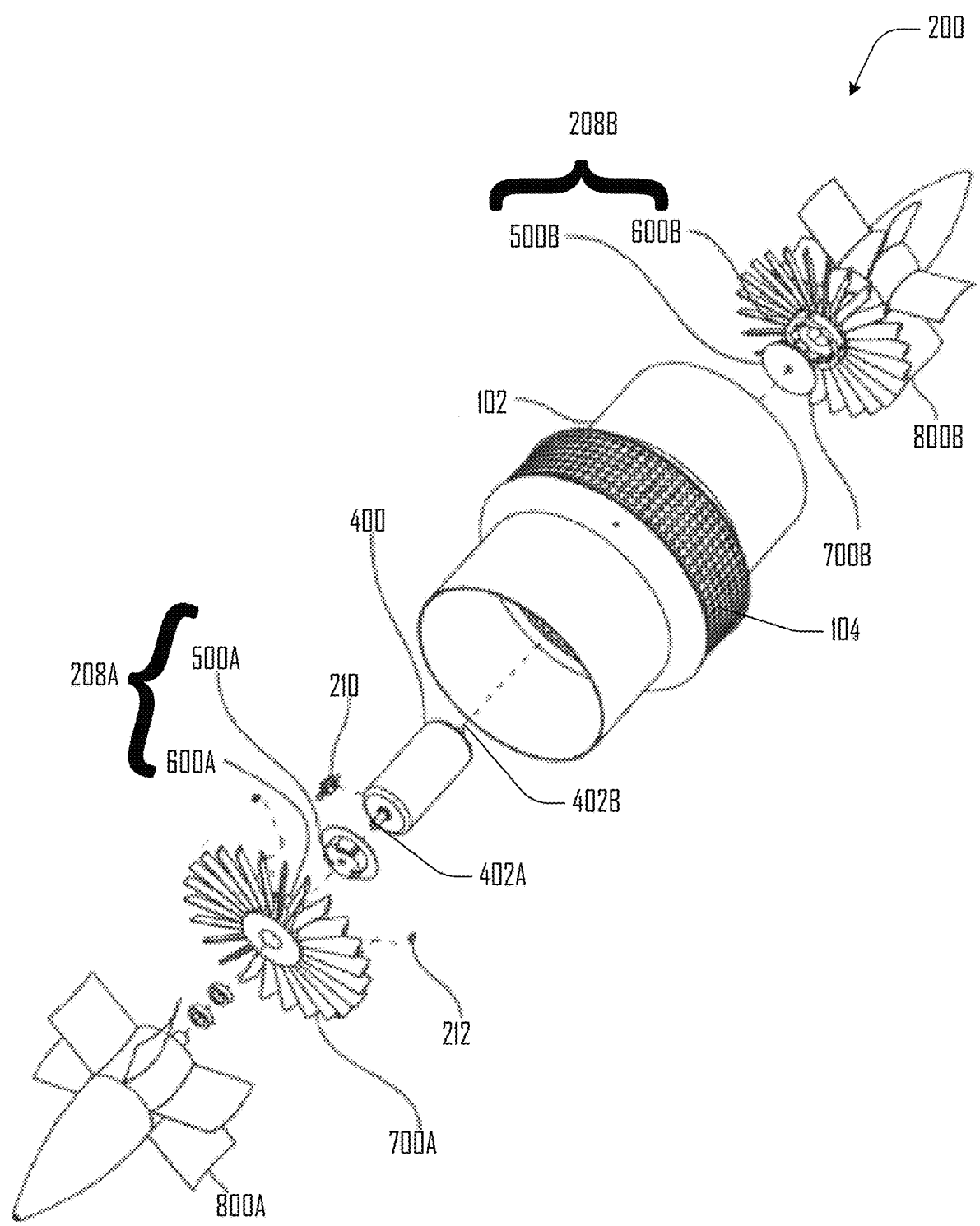
FIG. 2 illustrates bidirectional thrust assembly component parts, in accordance with an embodiment.

FIG. 2 illustrates examples of bidirectional thrust assembly components 200, in accordance with an embodiment. In this example, bidirectional thrust assembly components 200 may comprise case 102, motor 400, plurality of freewheel assemblies 208A and 208B, plurality of fans 700A and 700B (which may also be referred to as "fan blade assemblies"), and plurality of stators 800A and 800B. Within case 102, motor 400 may be mounted in a central position (both axially and radially), such that an axis of rotation of motor 400 is along the long central axis of the case, as indicated by a dashed line in FIG. 2. Within motor 400 are axle 402A and 402B, which may be two ends of a double ended driveshaft ("axle", "drive shaft", and "driveshaft" may be synonyms, herein).

Each freewheel assembly 208A and 208B may be secured to axle 402A and 402B, projecting from each end of motor 400. Each freewheel assembly 208 may comprise pawl wheel 500 and ratchet wheel 600, illustrated and discussed further in relation to FIG. 5 and FIG. 6. Pawl wheel 500 may be secured to motor 400 and, as discussed further herein, may be configured to transfer drive force or torque from motor 400 to ratchet wheel 600 and then to fan 700 selectively, depending on the direction of rotation of motor 400.

In embodiments, freewheel assembly 208 may be or comprise, for example, a clutch which may be engaged or disengaged to transfer or not transfer power, such as torque, from motor 400 via axle 402. In embodiments in which freewheel assembly 208 is or comprises a clutch, the clutch may be actively engaged or disengaged by a clutch activation mechanism, such as by a solenoid or the like. Such an active engagement mechanism may obtain power from, for example, an electrical connection via slip rings or the like on axle 402. In embodiments in which freewheel assembly 208 is or comprises a clutch, the clutches may be passively engaged or disengaged by a clutch activation mechanism, such as by a direction of rotation and inertia (e.g. as in a centrifugal clutch), in a similar manner to pawl engagement mechanism 506, pocket 510, and pawl wheel 500, via a hydraulic clutch activation mechanisms, and the like. In embodiments in which freewheel assembly 208 is or comprises a clutch, freewheel assembly 208 may not comprise, for example pawl wheel 500 and ratchet wheel 600, but may instead comprise, for example, a solenoid which engages to lock the two faces of the drivetrain together, a clutch pad and a clutch face, wherein an actuator may be engaged to develop friction between the clutch pad and clutch face and to thereby transfer torque from a first side with the clutch pad to a second side with the clutch face, or the like Fan 700 may have individual airfoils oriented other than as illustrated. The illustrated airfoils are asymmetric, which is intended to illustrate an example in which fan 700 is a unidirectional fan, which may provide greater thrust than a symmetric airfoil on a bidirectional fan. In an embodiment, airfoils of fan 700 may be symmetric, as may be the case if each individual of fan 700A and 700B are bidirectional. Airfoils illustrated in fan 700 may be oriented incorrectly in figures herein; the airfoils may more properly be oriented with the thicker end of the airfoil proximate to fluid inlet 104, such that the thicker end is the leading edge of fan, as thrust fluid is propelled out of case 102 by motor 400 and fan 700. Fan 700 may be secured to ratchet wheel 600, such that torque from motor 400 is transmitted by pawl wheel 500 to ratchet wheel 600, causing rotation of fan 700 and acceleration of thrust fluid out of case 102 and output port 106.

In an embodiment, ratchet wheel 600 or other portion of bidirectional thrust assembly 100 may be configured with one or more braking means. Braking means may comprise a friction-based or frictionless braking device. Friction-based braking means may comprise a disk or drum brake, for example. An example of a frictionless braking device is illustrated and discussed in relation to FIG. 9 and FIG. 10. In overview, hub magnet 212 may be mounted to, for example, fan 700, ratchet wheel 600, or the like. Solenoid 210 may be mounted on motor 400, case 102, or another non-rotating portion of bidirectional thrust assembly 100. Solenoid 210 may comprise a magnet or ferromagnetic material. Solenoid 210 may be engaged or extended, such as by an electrical current, such that the magnet or ferromagnetic material of solenoid 210 may be made to become proximate to hub magnet 212. When so engaged or extended, the magnet of solenoid 210 may apply an attractive force on hub magnet 212 and may thereby slow or prevent rotation of freewheel assembly 208 and fan 700, thereby providing frictionless braking of the corresponding fan 700. Braking of a fan 700, whether frictionless or otherwise, may be performed, for example, to rapidly reduce or eliminate a thrust vector from the fan 700, to smooth flow of thrust fluid, to reduce sound, reduce production of radio interference, and the like. This is an example; other means may be provided to provide friction-based or frictionless braking of fan 700.

Fan 700 may be coupled to a shaft, such as a stationary shaft, extending toward or of stator 800. Bearings 214 may support fan 700 radially around the shaft of stator 800, thereby reducing friction as fan 700 rotates when driven by motor 400.

Stator 800 may provide aerodynamic control of airflow or moving thrust fluid propelled by rotating fan 700. If thrust fluid propelled by fan 700 has a rotational component, stator 800 may remove some or all of such rotational component, which may reduce turbulence, may reduce noise, may recover a component of such rotational energy as additional thrust, and or otherwise may improve efficient or desired operational characteristics the bidirectional thrust assembly 100.

Figure 3:
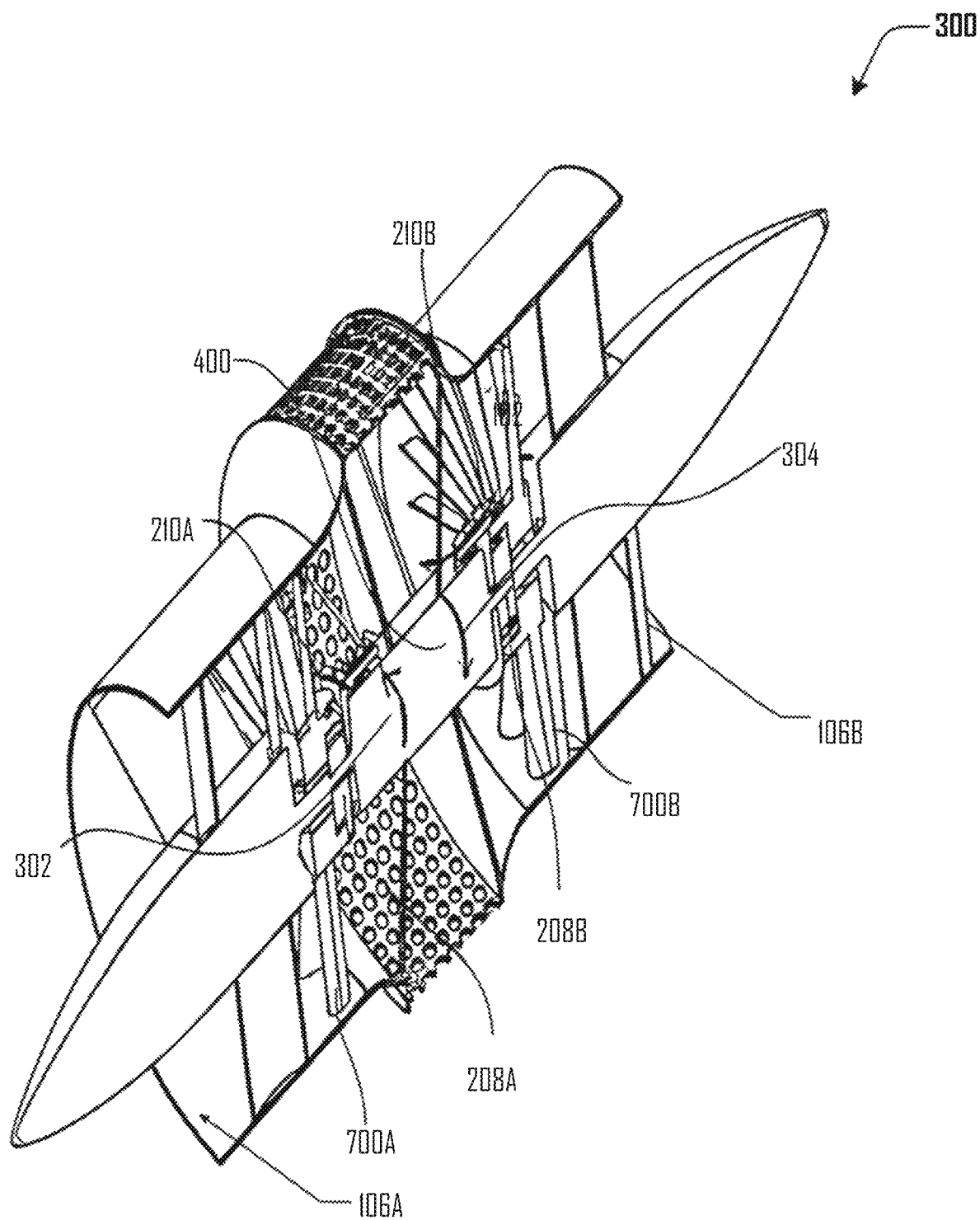
FIG. 3 illustrates a cross section of a bidirectional thrust assembly, in accordance with an embodiment.

FIG. 3 illustrates cross section 300 of bidirectional thrust assembly 100, in accordance with an embodiment. In this embodiment, assemblies to the left of motor 400 (from a viewer's perspective of FIG. 3) are configured to provide thrust and a thrust vector in a direction away from motor 400 when motor 400 rotates in counterclockwise direction 302 (clockwise and counterclockwise relative to a viewer looking at stator 800A and into bidirectional fan assembly 100). Assemblies to the right of motor 400 are configured to provide thrust and a thrust vector in an opposing direction away from motor 400 when motor 400 rotates in a clockwise direction 304.

When motor 400 rotates in counterclockwise direction 302, such as due to a thrust control module (examples of which are illustrated and discussed in relation to suspended load control system operational module 1400 and or suspended load control system decision and thrust control module 1500), freewheel 208A may engage to transfer torque to and to thereby rotate fan 700A. Solenoid 210 may be deactivated, so that it has no braking effect on fan 700A. Solenoid disengagement and engagement is illustrated in more detail in FIG. 9 and FIG. 10. As noted, rotation of fan 700A may develop a flow of thrust fluid from fluid inlet 104 out of outlet port 106A, creating a thrust vector away from motor 400 in that direction. Under such circumstances, freewheel assembly 208B may disengage from fan 700B, such that torque from motor 400 is not transferred to fan 700B. As discussed herein, freewheel assembly 208B may disengage passively, based only on the direction of rotation of motor 400, without an independently powered actuator. Under such circumstances, solenoid 210B may instead be engaged, such as by a thrust control module, to prevent fan 700B from rotating. An engaged configuration of solenoid 210 is illustrated and discussed in relation to FIG. 10.

When motor 400 is switched to rotate in clockwise direction 304, such as due to a thrust control module (examples of which are illustrated and discussed in relation to suspended load control system operational module 1400 and or suspended load control system decision and thrust control module 1500), freewheel assembly 208A may disengage, thus ceasing to transfer torque to fan 700A. Solenoid 210A may be engaged, such by a thrust control module, and may slow or stop motion of fan 700A with a frictionless braking force. When motor 400 is switched to rotate in clockwise direction 304, such as by a thrust control module, freewheel assembly 208A may disengage to no longer transfer torque to fan 700A and freewheel assembly 208B may engage and transfer torque to fan 700B. As discussed herein, freewheel assembly 208A may disengage passively and freewheel assembly 208B may engage passively, based only on the direction of rotation of motor 400, without an independently powered actuator acting on either freewheel assembly 208A or 208B. Under such circumstances, solenoid 210B may be disengaged, such as by a thrust control module, such that solenoid 210B exerts no braking force on fan 700B. Under such circumstances, rotation of fan 700B by torque from motor 400 may develop a flow of thrust fluid from fluid inlet 104 out of outlet port 106B, creating a thrust vector away from motor 400 in that direction.

When motor 400 is turned off, one or both of solenoid 210A and 210B may be activated.

As discussed herein, the two thrust vectors produced by fan 700A and 700B may be opposite or opposing. Alternation between the two thrust vectors, or production of no thrust vector, may be achieved by changing a direction of rotation of motor 400 or by turning motor 400 off. Thrust vectors produced by fan 700A and fan 700B in bidirectional thrust assembly 100 may be more efficient than thrust vectors produced by a single bidirection fan. With only one motor, bidirectional thrust assembly 100 may have fewer parts than, be simpler than, may be lighter than an assembly comprising two unidirectional fans, each driven by a separate motor.

Figure 4:
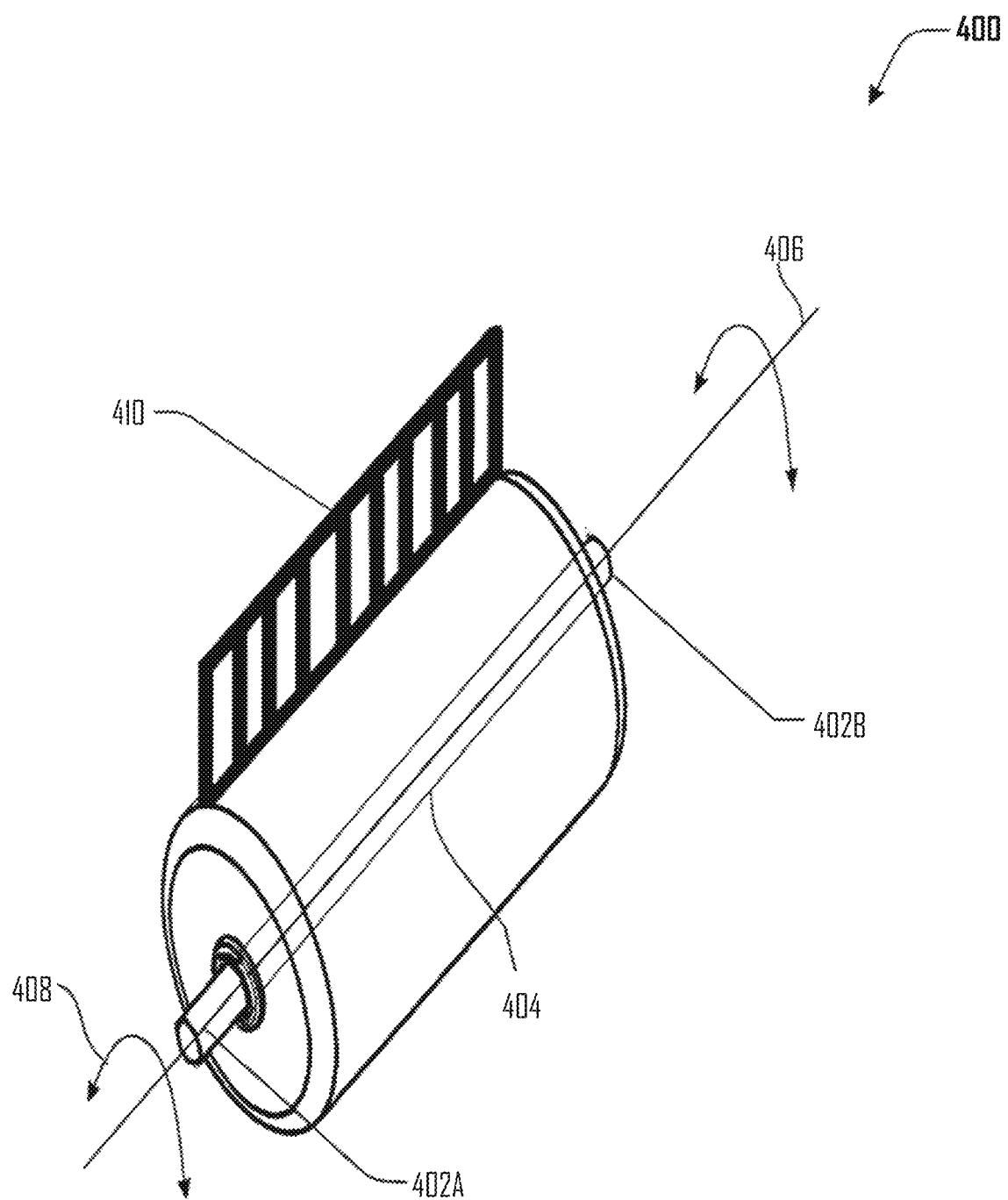
FIG. 4 illustrates a motor for use within a bidirectional thrust assembly, in accordance with an embodiment.

FIG. 4 illustrates motor 400, in accordance with an embodiment. Motor 400 comprises axles 402A and 402B which may, in some embodiments be two ends of continuous axle or double ended driveshaft 404 running through motor 400. In this manner, motor 400 may drive double ended driveshaft 404 around single axis of rotation 406 in one of two modes of bidirectional rotation 408 (clockwise and counterclockwise, relative to a viewer proximate to and looking at axle 402A, toward axle 402B).

A double ended driveshaft may be used so that each end of the driveshaft may drive a separate fan. Motor 400 may be able to rotate in either direction. Motor 400 in embodiments may be a brushed electric motor or a brushless electric motor. The direction of rotation of motor 400 may be controlled by a thrust control module which may interact with, for example, electronic speed controllers, commutators, and other logical components of a control system to control the direction of rotation of motor 400.

As illustrated in FIG. 3, motor 400 may be located centrally within case 102 of bidirectional thrust assembly 100, both with regard to an axial length of the assembly and a radial width of the assembly. A support framework or a plurality of support structures may hold and or stabilize motor 400 in this location. Such supports may also provide mounting or conduits for cables carrying electrical power or control signals for motor 400, solenoids, or any other electrical components within case 102.

Motor 400 may comprise a heat sink, heat transfer structure, radiator or the like. In an embodiment, one or more radiator fin 410 may project out from motor 400 into a flow of thrust fluid drawn into case 102. Windings of motor 400 may be proximate to radiator fin 410; permanent magnets of motor 400 may be proximate to axle 402; heat produced in the windings, proximate to radiator fin 410, may radiate or otherwise be conducted out of radiator fin 410 into surrounding fluid, such as thrust fluid.

Figure 20:
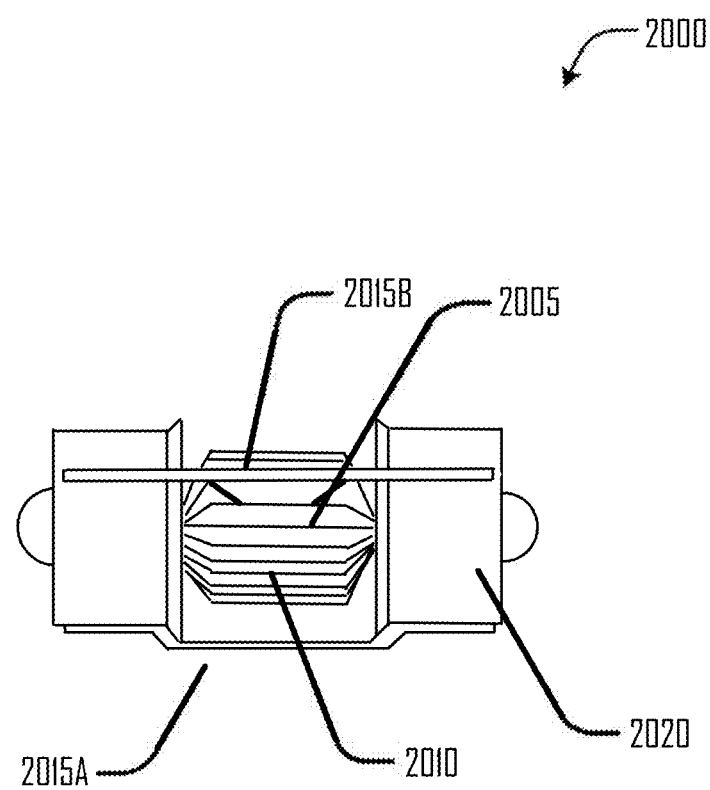
FIG. 20 illustrates an example of a motor with a heat sink and support frame, in accordance with an embodiment.

An addition embodiment of a heat sink and a support framework in relation to a motor is illustrated and discussed in relation to FIG. 20.

Figure 5:
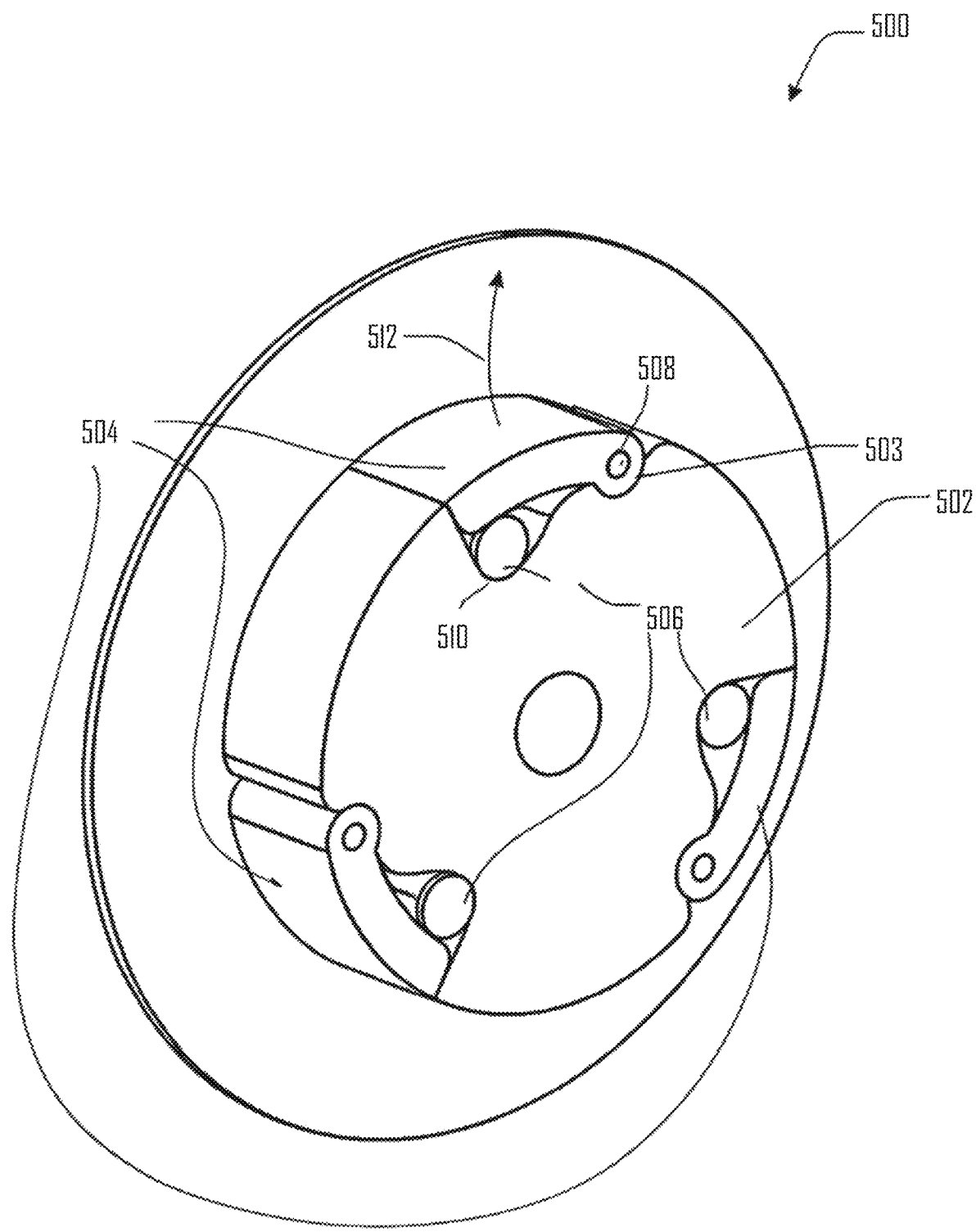
FIG. 5 illustrates a pawl wheel for use within a selective power transfer mechanism, in accordance with an embodiment.

FIG. 5 illustrates pawl wheel 500, in accordance with an embodiment. Pawl wheel 500 may be part of freewheel assembly 208. Engagement or disengagement of freewheel 208A and 208B to transmit torque to fan 700A and 700B may depend on a direction of rotation of motor 400. Freewheels 208 may be configured such that each is engaged independently and one at a time, allowing the fans to be engaged or disengaged based on a direction of rotation of motor 400, thereby producing bidirectional thrust vectors, which may be used to stabilize or control a load. Pawl wheel 500 may be the driving portion of freewheel 208, and, as such, may be secured directly to axle 402.

Figure 6:
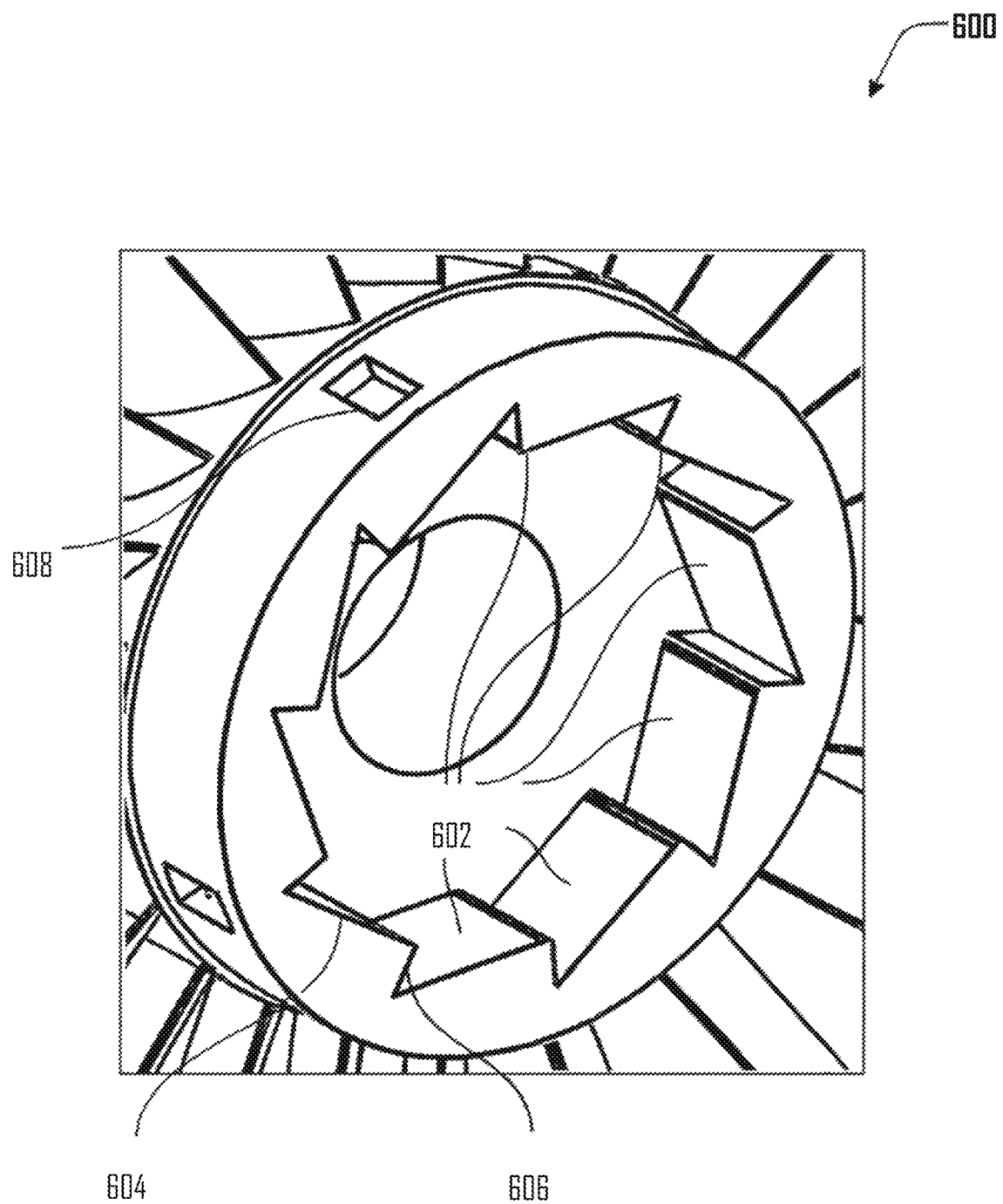
FIG. 6 illustrates a ratchet wheel for use within a selective power transfer mechanism, in accordance with an embodiment.

In the example illustrated in FIG. 5, pawl wheel 500 comprises base wheel 502, plurality of pawls 504 and plurality of pawl engagement mechanisms 506. In some embodiments, each of the plurality of pawls 504 may comprise hinge 508; hinge 508 may be seated in hinge shoulder 503. In embodiments, plurality of pawl engagement mechanisms 506 may be balls or rods, each of which sit within pocket 510 of base wheel 502 when pawl 504 is retracted. In an embodiment, pocket 510 may be shaped as a well, such that when pawl wheel 500 rotates in a clockwise direction (relative to a viewer looking at FIG. 5), inertia drives pawl engagement mechanism 506 down into a corner of pocket 510 and such that when pawl wheel 500 rotates in a counterclockwise direction (relative to a viewer looking at FIG. 5), inertia drives pawl engagement mechanism 506 toward pawl 504, causing pawl 504 to rotate around hinge 508, move outward 512, and engage teeth 602 of ratchet wheel 600, examples of which are illustrated in FIG. 6. In an embodiment, spring loading or another force may cause or may further cause plurality of pawl engagement mechanisms 506 to press outward from pockets 510, against the underside of the associated pawl, causing pawl 504 to rotate around hinge 508, move outward 512, and engage teeth 602 of ratchet wheel 600, examples of which are illustrated in FIG. 6.

FIG. 6 illustrates ratchet wheel 600, in accordance with an embodiment. Ratchet wheel 600 may be the driven part of freewheel 208 and, as such, may be attached directly to fan 700. Ratchet wheel 600 may comprise one or more teeth 602 cut into or arranged around an inner diameter or opening within ratchet wheel 600; teeth 602 may engage or disengage with or relative to pawls 504 of pawl wheel 500, such as depending on a direction of torque of the motor.

Each of teeth 602 may comprise long tooth face 604 and short tooth face 606; pawls 504, driven by pawl engagement mechanism 506, may contact short tooth face 606 and transfer torque from base wheel 502, through hinge shoulder 503, through teeth 602, into ratchet wheel 600, and then into fan 700. In this manner, pawl wheel 500 may spin within ratchet wheel 600 only when motor 400 rotates in one direction. In the example illustrated in FIG. 6, looking at the bottom teeth of ratchet wheel 600, long tooth face 604 slopes up from right to left at a gradual angle.

As pawl wheel 500 spins counterclockwise within the ratchet wheel, the gradual slope of long tooth face 604 may act to depress pawls 504 and keep pawl engagement mechanisms 506 within pockets 510. This may allow pawl wheel 500 to rotate within ratchet wheel 600, without engaging with short tooth face 60, thus transferring no or minimal torque or rotational force to ratchet wheel 600 and an associated fan.

In this mode of operation, ratchet wheel 600 may be held in place by a braking means, such as one or more solenoid magnets being engaged so as to exert a magnetic attraction on hub magnets or ferromagnetic material, which may be seated within magnet slot 608.

When the direction of motor 400 is reversed and pawl wheel 500 begins to spin clockwise, the steep angle of short tooth face 606 may act to catch the tips of pawls 504, thus coupling pawl wheel 500 to teeth 602 of ratchet wheel 600, such that rotation of and torque on pawl wheel 500, as driven by motor 400, is transferred to ratchet wheel 600, and thus an associated fan 700, causing fan 700 to spin, accelerate thrust fluid, and impart a force vector on case 102 and a larger structure secured to case 102.

Figure 7:
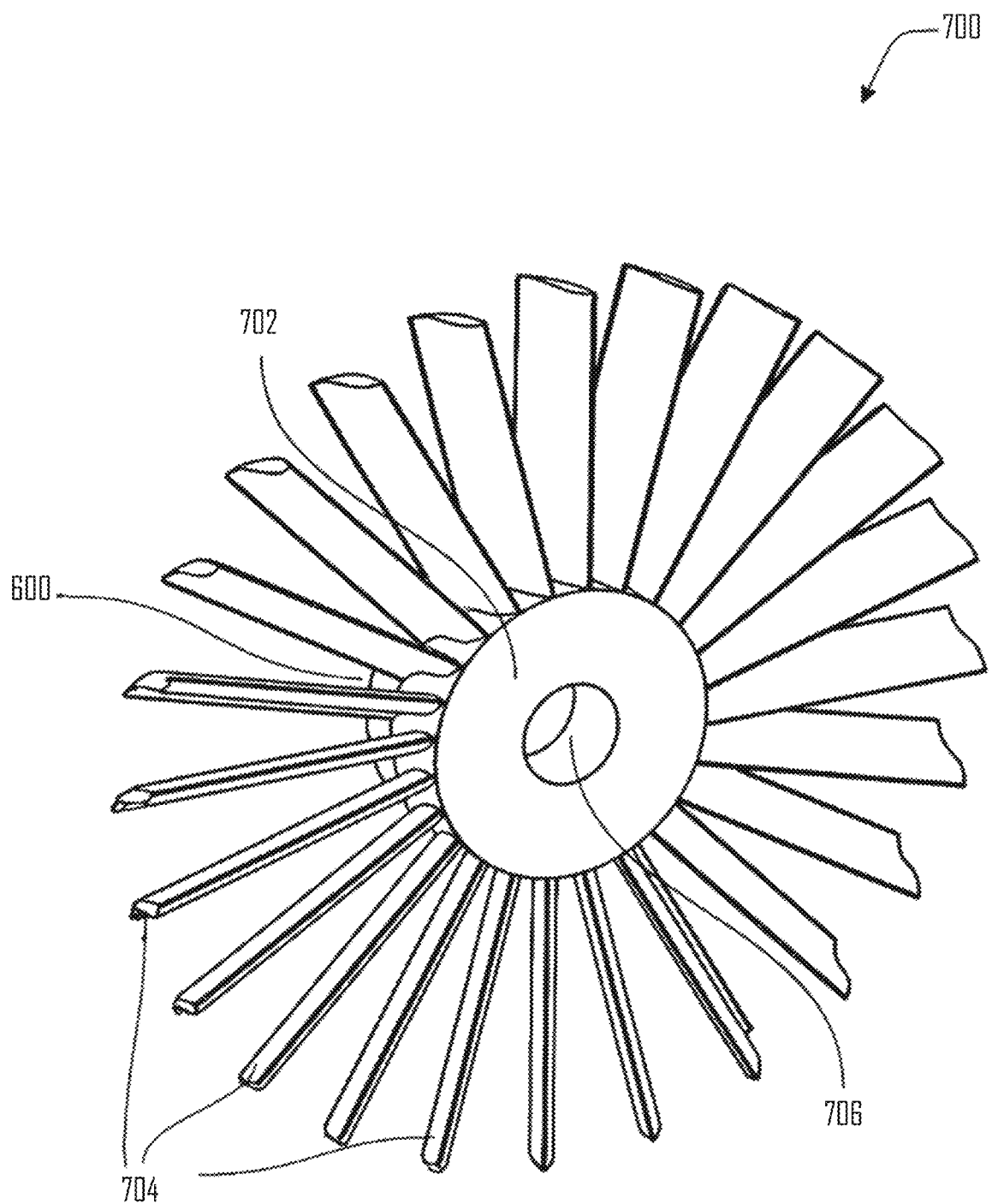
FIG. 7 illustrates a fan for use within a bidirectional thrust assembly, in accordance with an embodiment.

FIG. 7 illustrates an example of fan 700, in accordance with an embodiment. Fan 700 may comprise fan hub 702 surrounded by blades 704 and provided with a centrally located axial aperture 706.

Blades 704 of fan 700 may be designed to optimize transfer of energy to thrust fluid and output of a force vector thrust thereby. The cross-sectional profile of each blade or airfoil, curvature along the length of each blade, and the angle at which each blade meets the fan hub 702 may be varied. Variations may improve thrust when rotated in one direction, as in a unidirectional fan, or may allow operation of fan 700 in either rotational direction. Unidirectional fans may have an asymmetric cross section while bidirectional fans may have a symmetric cross section. In some embodiments, fan blades 704 may be configured to automatically feather (i.e., adjust in curvature and angle) based on desired thrust performance. As noted herein, airfoils illustrated in fan 700 may be oriented incorrectly; the airfoils may more properly be oriented with the thicker end of the airfoil proximate to fluid inlet 104, such that the thicker end is the leading edge of fan, as thrust fluid is propelled out of case 102 by motor 400 and fan 700.

Axial aperture 706 may allow fan 700 to be coupled to a structure fixed to, for example, case 102 and or a shaft of stator 800 by means of bearings, as illustrated and discussed in relation to FIG. 2. Bearings seated within axial aperture 706 may stabilize and support fan 700 on outlet fin shaft 806 and or stator 800, reducing friction as fan 700 rotates.

Ratchet wheel 600 may be secured to fan hub 702. In this manner, torque from motor 400 may drive freewheel assembly 208, cause fan 700 to turn, accelerate thrust fluid, impart a force vector on case 102, and on an object secured to case 102, such as on an SLCS or other maneuvering object or craft.

Figure 8:
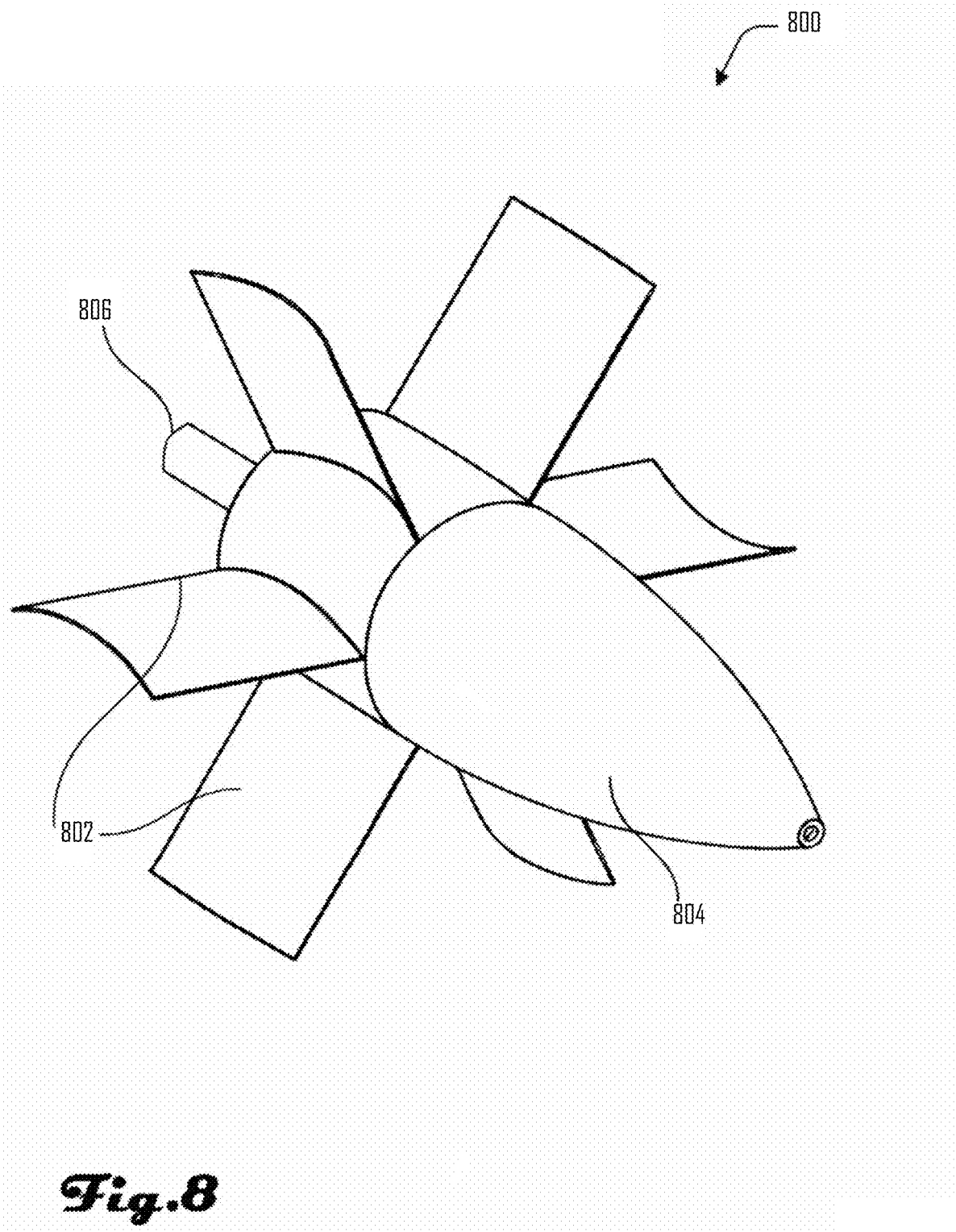
FIG. 8 illustrates a stator for use within a bidirectional thrust assembly, in accordance with an embodiment.

FIG. 8 illustrates stator 800 in accordance with an embodiment. Each output port 106 may comprise stator 800, there within. Stator 800 may comprise a plurality of stator fins 802, a fairing 804, and an outlet fin shaft 806.

Unlike the fan, fins of stator 800 may be fixed and rigid. In some embodiments, outer edges of stator fins 802 may be fixed to case 102. While fan blades may be essential in generating thrust through acceleration of thrust fluid, the thrust may be more efficient and effective when turbulence through the outlet is minimized, as may be accomplished by stator fins 802. In an alternative embodiment or theory, a rotational component of thrust fluid from fan 700 may transfer force to stator fins 802. In an alternative embodiment or theory, stator fins 802 may be designed to concentrate thrust fluid from fans in a desired direction, such as along aerodynamic fairing 804.

Stator 800 may thus enhance generation by a bidirectional thrust assembly of a force vector in a desired direction.

With stator 800 seated rigidly within case 102, outlet fin shaft 806 may provide a stable and stationary mount for fan 700, as illustrated and described in relation to FIG. 2 and FIG. 7.

Figure 9:
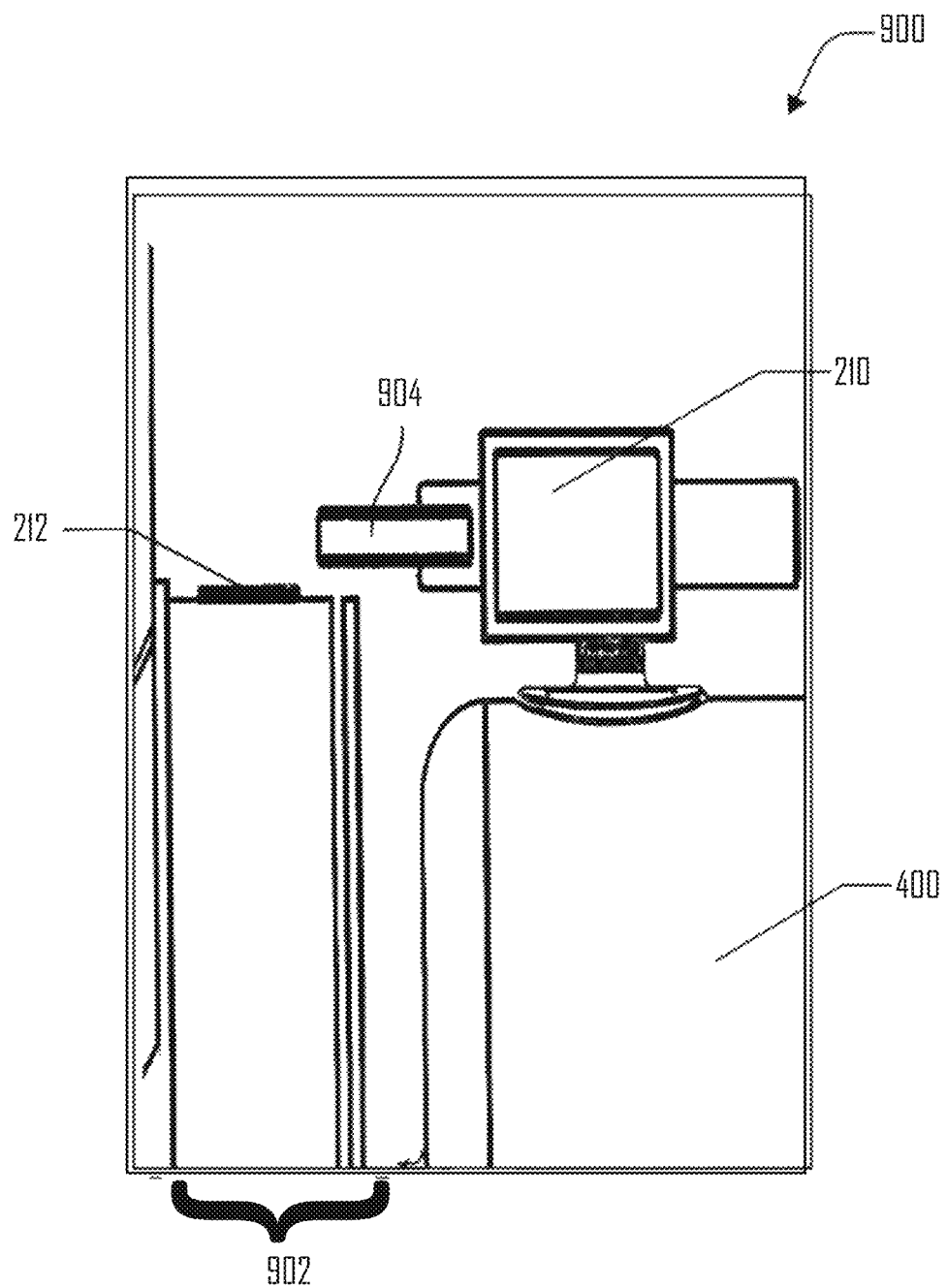
FIG. 9 illustrates a solenoid disengaged within a bidirectional thrust assembly, in accordance with an embodiment.
Figure 10:
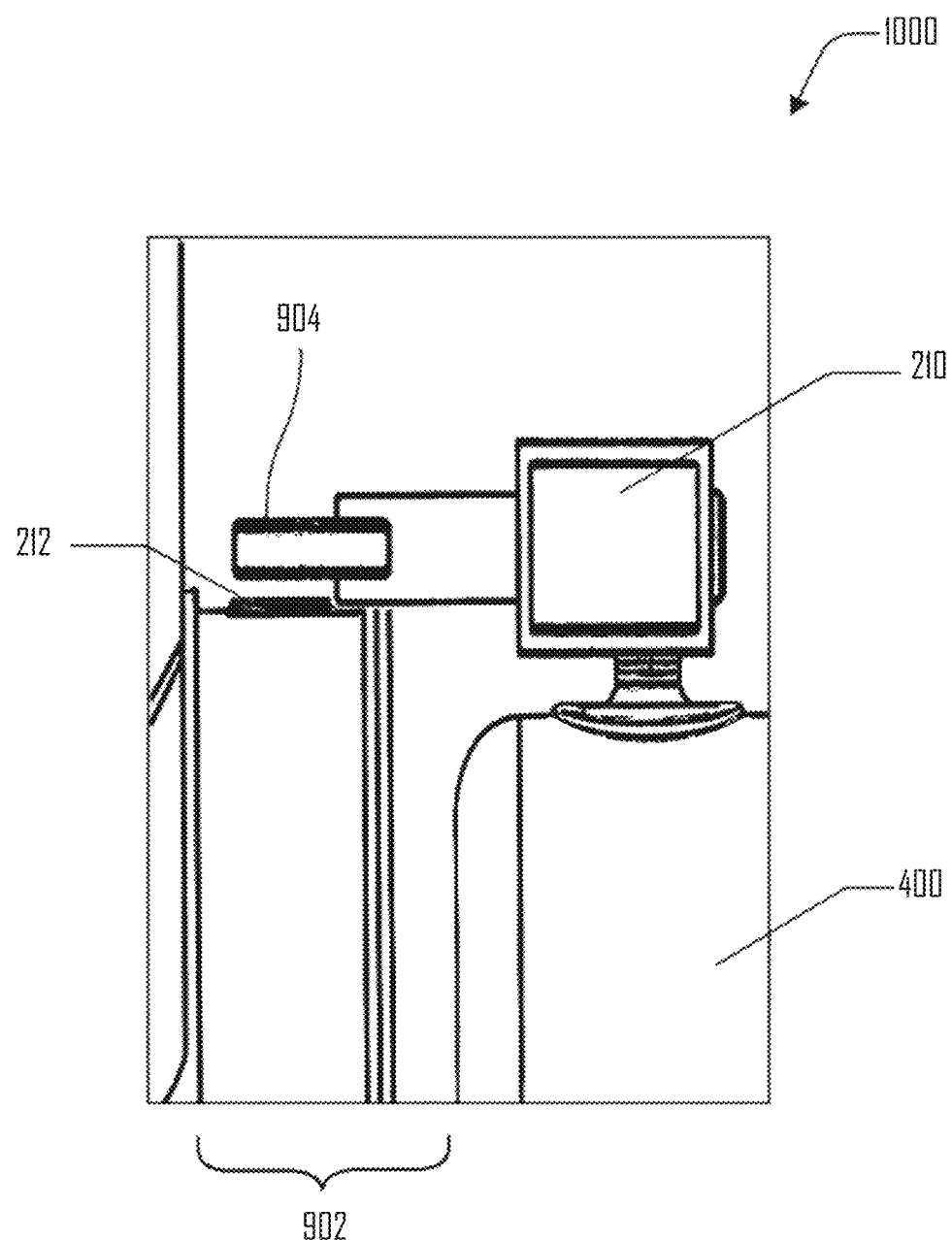
FIG. 10 illustrates a solenoid engaged within a bidirectional thrust assembly, in accordance with an embodiment.

FIG. 9 illustrates solenoid disengaged 900, in accordance with an embodiment. Braking, such as friction-based or frictionless braking, may be implemented for one or both fans, may be activated for one while the other is rotating, or may be deactivated. Applying a brake to a fan may halt a thrust vector by such fan, may streamline airflow, reduce noise, and the like. An example of braking means is illustrated in FIG. 9 and FIG. 10. In the illustrated example, one or more hub magnet 212 may be fitted on an outside periphery of hub 902 formed by, for example, freewheel assembly 208 and or fan 700. For example, magnets or a ferromagnet may be fitted into slots or equivalent on ratchet wheel 600, as illustrated in FIG. 6.

When it is desired that a fan receive torque from motor 400, turn, and generate a thrust vector, such as during operation of a thrust control module and as discussed in relation to FIG. 3, solenoid 210 may be disengaged, as illustrated in FIG. 9. In this disengaged state, solenoid magnet 904 coupled to the solenoid 210 may rest at a distance away from the hub magnet 212 such that magnetic attraction between hub magnet 212 and solenoid magnet 904 may not interfere with rotation of hub 902.

In an embodiment, solenoid 210 may carry a coil or similar magnetic and or electrically active component, such that a moving magnetic field, as may be provided by hub magnet 212 or a set of hub magnets 212 encompassing hub 902, may generate an opposing magnetic field in the coil or similar magnetic and or electrically active component of solenoid 210, thereby creating a magnetic brake, with power supplied by rotation of hub 902. More than one solenoid 210 may move the magnetic brake into and out of engagement with hub magnet 212.

Solenoid 210 may be mounted on motor 400 in some embodiments, as illustrated, or otherwise mounted so as to be stationary with respect to rotation of hub 902 and within a proximity that allows it to be engaged as described with regard to FIG. 10.

FIG. 10 illustrates solenoid engaged 1000, in accordance with an embodiment. When it is desired for a fan to be disengaged, to no longer produced thrust, or for thrust production by a fan to be halted, as may occur during operation of a thrust control module and as discussed in relation to FIG. 3, motor 400 direction may be reversed and freewheel assembly 208 may disengage. This may leave fan assembly 700 rotating around hub 902, which may be undesirable, such as due to residual thrust, disturbance flow of thrust fluid, noise, or other characteristics detrimental to performance of bidirectional thrust assembly 100. Under such circumstances, a brake, such as a friction-based or frictionless, may be employed, such as by engaging solenoid 210, as illustrated.

To engage solenoid 210, an electrical signal may be sent to solenoid 210, causing solenoid 210 to extend an arm or otherwise reposition solenoid magnet 904 such that it aligns with and is proximate to hub magnet 212 affixed to hub 902. In another embodiment, solenoid 210 may cause an arm to pivot into position when engaged, or otherwise be moved into proximity to hub magnet 212. When a magnet (or ferroelectric material) of solenoid 210 becomes proximate to hub magnet 212, rotation of fan 700 may be slowed or stopped.

Figure 11:
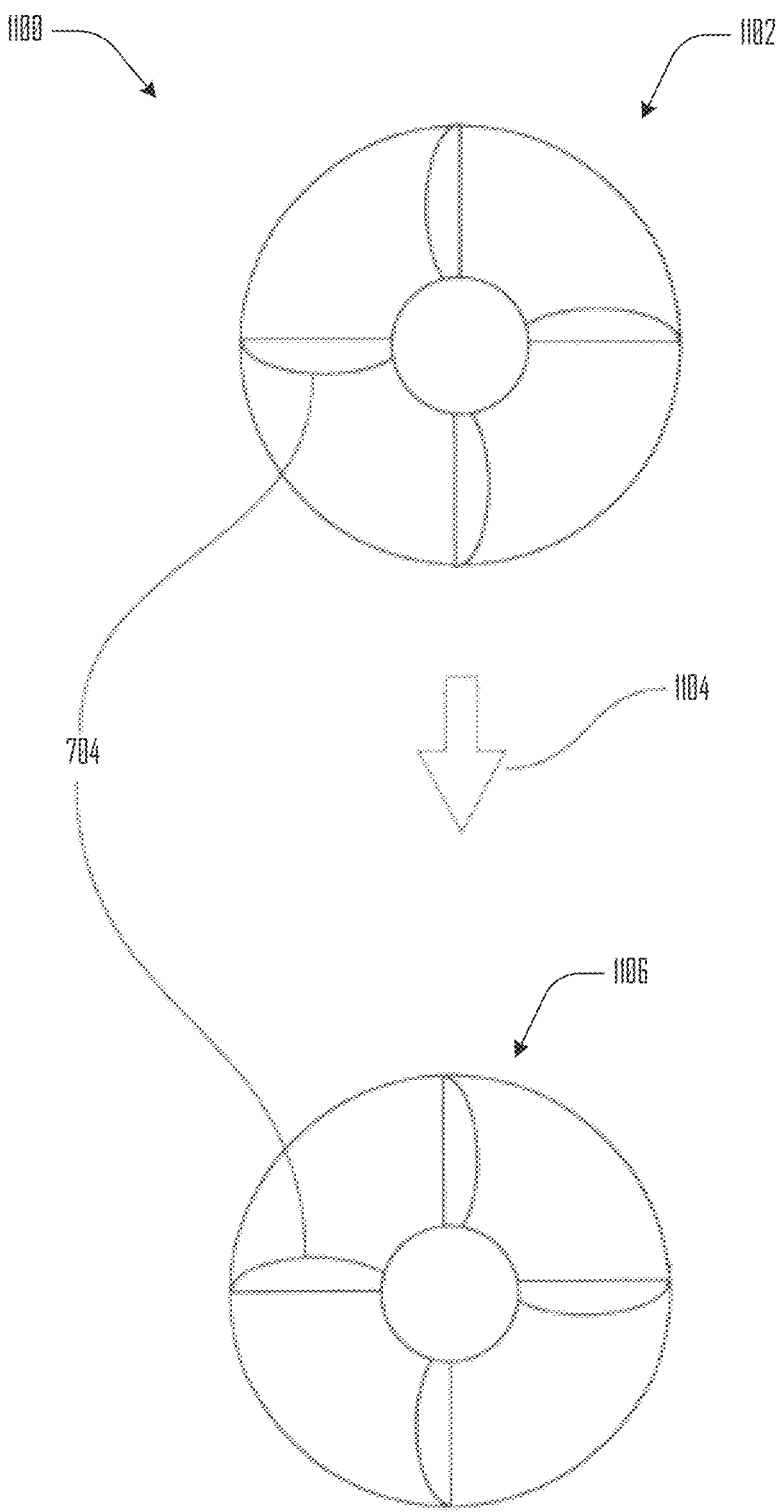
FIG. 11 illustrates feathering, in accordance with an embodiment.

FIG. 11 illustrates blade feathering 1100 in accordance with an embodiment. As discussed with regard to FIG. 7, the blades of a fan may be designed with a profile, curvature, or angle of meeting the hub that optimizes their ability to generate thrust in a single direction, e.g. resulting in unidirectional fans or blades. In some embodiments, fans used for a bidirectional thrust assembly may be configured such that they may automatically or passively feather, i.e., change their curvature and/or angle of attack with respect to the hub or the thrust fluid, based on a desired direction of thrust. This capability may allow motor 400 to generate thrust in opposing thrust vectors using both fans spinning at once. Such a configuration may further improve thrust while maintaining a smaller profile and lower power consumption.

In such an embodiment, both fans may, for example, rotate clockwise. The blade shape, curvature, and/or angle of attack may be optimized to push air and therefore generate a thrust vector in a first direction (e.g., into the sheet, as illustrated in FIG. 11). This may be seen in the illustrated configuration for maneuvering object in a first direction 1102.

In response to a control signal, in an embodiment in which fan blades feather, motor 400 may reverse direction 1104. Blades 704 may change shape, curvature, and/or angle of attack in response to the same signal and or in response to the direction of rotation.

As a result, blades 704 may feather into a configuration for maneuvering object in a second direction 1106. That is, the blade shape, curvature, and/or angle of attack may reverse or otherwise be altered to optimize the fan's ability to propel thrust fluid while rotating in a counterclockwise direction, thereby improving thrust generated in a second direction (e.g., out of the sheet, as illustrated in FIG. 11).

Bidirectional thrust assembly 100 may be found in and used by thrust control modules of, for example, a craft, such as a watercraft, an aircraft, or a VTOL craft, and or another suspended load control system or load stability system not capable of independent flight, all of which may be referred to together as, "SLCS". As discussed herein, an SLCS may control a load, independent from a carrier, by outputting force vectors from fans at, or near, the location of the load.

Examples of thrust control modules in or of an SLCS are illustrated and discussed herein; it should be understood that similar thrust control modules may be found in and or used by other craft, such as watercraft, an aircraft, and or a VTOL craft.

Figures 12A, 12B, 12C:
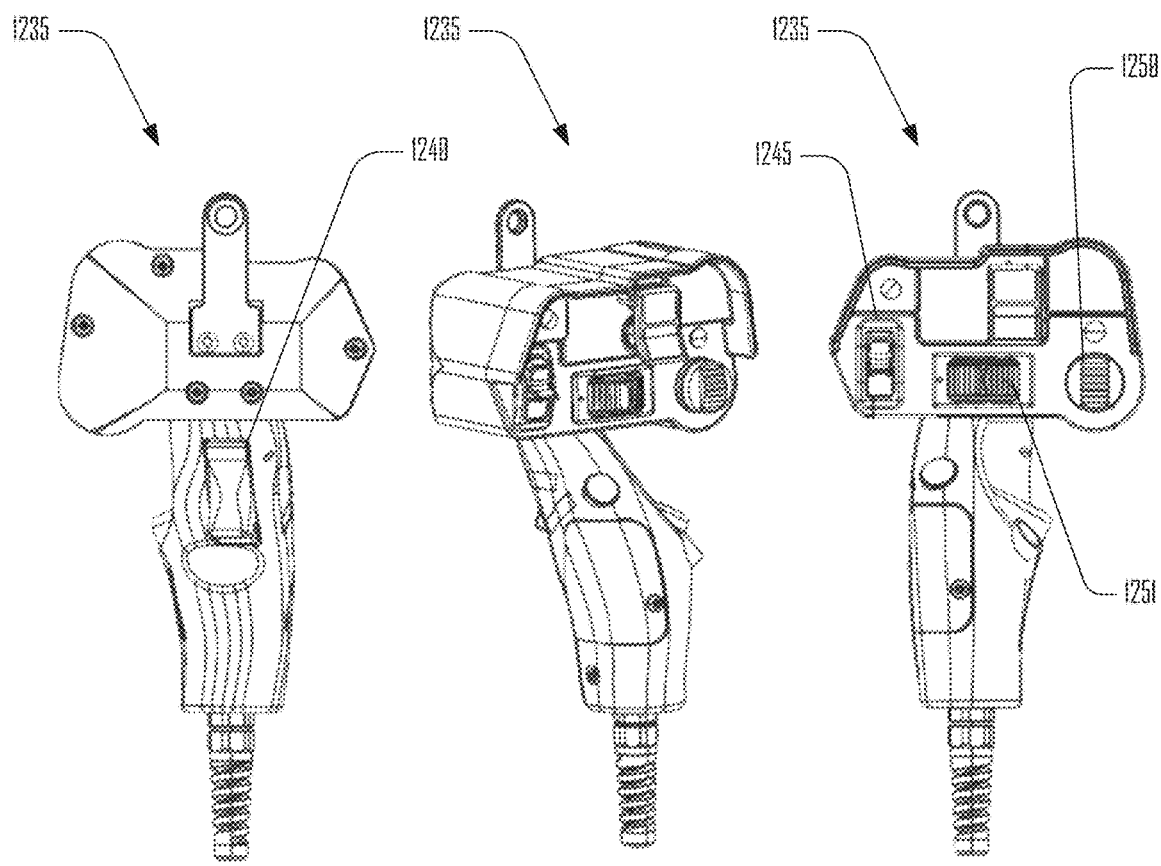
FIG. 12A is a back elevation view of a remote pendant which may be used with a bidirectional thrust assembly comprising a suspended load control system, in accordance with an embodiment.
FIG. 12B is an oblique view of the remote pendant of FIG. 12A, in accordance with an embodiment.
FIG. 12C is a front elevation view of the remote pendant of FIG. 12A, in accordance with an embodiment.

FIG. 12A illustrates an embodiment of remote pendant 1235 comprising, for example, activation controller 1240. FIG. 12B illustrates another view of an embodiment of remote pendant 1235. FIG. 12C illustrates another view of an embodiment of remote pendant 1235 comprising, for example, on/off switch 1245, state selector 1250, and manual/rotational control 1251. On/off switch 1245 may be used to turn on remote pendant 1235. State selector 1250 may be used to select a command state operational module 1400, as may be discussed in relation to FIG. 14. Activation controller 1240 may be used to activate or deactivate an SLCS in or relative to a selected command state. Manual/rotational control 1251 may be used to manually activate fans to rotate or translate a load.

FIG. 12A illustrates an embodiment of remote pendant 1235 comprising, for example, activation controller 1240. FIG. 12B illustrates another view of an embodiment of remote pendant 1235. FIG. 12C illustrates another view of an embodiment of remote pendant 1235 comprising, for example, on/off switch 1245, state selector 1250, and manual/rotational control 1251. On/off switch 1245 may be used to turn remote pendant 1235 on or off. State selector 1250 may be used to select a command state of operational module 1400, as may be discussed in relation to FIG. 14. Activation controller 1240 may be used to activate or deactivate operational module 1400 in or relative to a command state selected or indicated by state selector 1250. Manual/rotational control 1251 may be used to manually activate fans to rotate or translate a load when state selector 1250 has been used to select, for example, direct control mode 1427.

Figure 13:
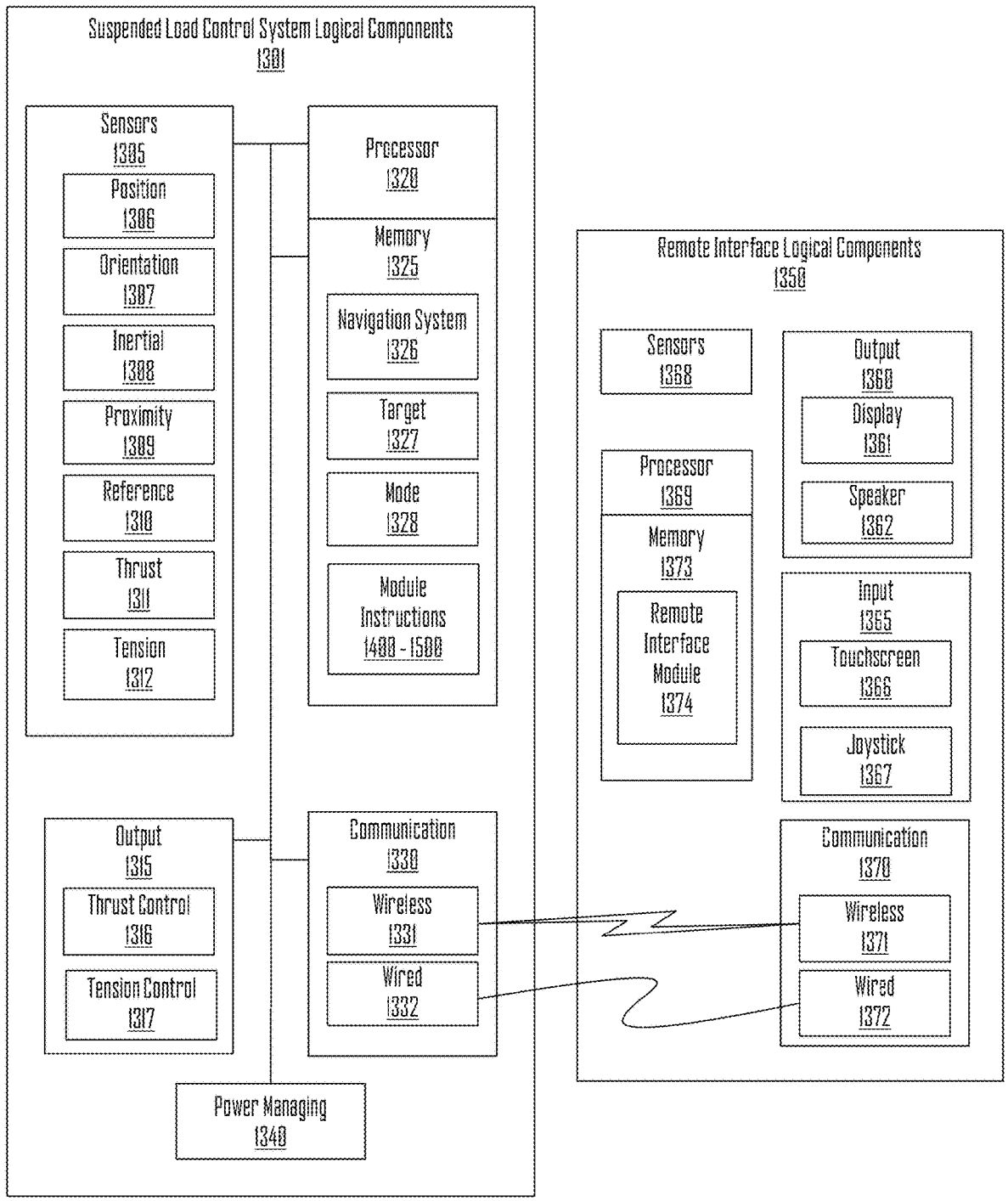
FIG. 13 schematically illustrates suspended load control system logical components and remote interface logical components for use with a bidirectional thrust assembly, in accordance with one embodiment.

FIG. 13 schematically illustrates suspended load control system logical components 1301 and remote interface logical components 1350, in accordance with one embodiment. Within load control system logical components 1301 are sensor suite 1305, which may include position sensors 1306, orientation sensors 1307, inertial sensors 1308, proximity sensors 1309, reference location sensors 1310, thrust sensors 1311, and cameras. SLCS processing capacity 1320 may comprise a computer processor and microcontrollers. SLCS memory 1325 may comprise a random-access memory ("RAM"), read-only memory ("ROM"), and permanent non-transitory mass storage device, such as a solid-state drive, and may contain navigation system 1326, target data 1327, mode or command state information 1328, and software or firmware code, instructions, or logic for one or more of operational module 1400 and suspended load control decision and thrust control module 1500. Communication systems 1330 may comprise wireless systems 1331 such as a wireless transceiver, and wired systems 1332. SLCS output 1315 may comprise thrust control 1316 via power controllers or ESCs. Power managing systems 1340 regulate and distribute the power supply from, e.g., the batteries. A data bus couples the various internal systems and logical components of load control system logical components 1301.

An interactive display, remote interface, remote positional unit, or target node may be a computational unit comprising one or more of remote interface logical components 1350; such a unit may be self-powered or hardwired into an airframe. The remote interface logical components 1350 receive data from and/or send data to the SLCS, e.g., wirelessly. The data from the SLCS may be displayed in display 1361 of remote interface logical components 1350; the computational data is parsed and converted to visual cues. Remote interface logical components 1350 may also communicate an SLCS operator's desired command states and operational instructions, as discussed below.

Remote interface logical components 1350 may be in communication with load control system logical components 1301 via communication systems 1370, which may be wireless 1371 or wired 1372. Output 1360 from remote interface logical components 1350 may comprise information displayed on a screen or display 1361, and auditory cues or access to remote audio (such as audio detected by sensors in a load) via audio output 1362. Input 1365 to remote interface logical components 1350 to control an SLCS may comprise commands through a touchscreen 1366 or a joystick 1367 or other input interface. In various embodiments, remote interface logical components 1350 may comprise one or more physical and/or logical devices that collectively provide the functionalities described herein.

Aspects of the system may be embodied in a specialized or special purpose computing device or data processor that is specifically programmed, configured, or constructed to perform one or more computer-executable instructions explained in detail herein, in conjunction with suitable memory. Aspects of the system may also be practiced in distributed computing environments where tasks or modules are performed by remote processing devices and memory that are linked through a communications network, such as a local area network (LAN), wide area network (WAN), or the Internet. In a distributed computing environment, modules may be located in both local and remote memory storage devices. As schematically illustrated in FIG. 13, load control system logical components 1301 and remote interface logical components 1350 are coupled by a wired or wireless network.

Load control system logical components 1301 may work with a remote positional unit, remote interface, or target node comprising one or more remote interface logical components 1350, in accordance with one embodiment. The remote positional unit, remote interface, or target node may comprise an internal or external sensor suite, such as sensors 1368, configured to communicate, such as wirelessly, with load control system logical components 1301 as a positional reference. Sensors 1368 may be similar to sensors 1305. If sensors 1305 are considered the primary sensor suite, a secondary sensor suite location may be the platform or carrier from which a suspension cable is suspended, sensors 1368 in or in communication with remote interface logical components 1350, and a tertiary sensor suite location may be a location of interest for the load (e.g., for positioning to obtain or deliver the load). Remote interface logical components 1350 may further comprise processor 1369 and memory 1373, which may be similar to processor 1320 and memory 1325. Memory 1373 may comprise software or firmware code, instructions, or logic for one or more modules used by the remote positional unit, remote interface, or target node, such as remote interface module 1374. For example, remote interface module 1374 may provide control and interface for a remote positional unit, remote interface, or target node, such as to allow it to be turned on/off, to pair it with an SLCS, to input instructions, or the like.

A remote positional unit may comprise a transceiver configured to communicate with load control system logical components 1301 via a wireless transceiver and provide a positional reference. For example, a remote positional unit may be secured to a helicopter ownship or crane below which a load may be suspended, a remote positional unit may be secured to a load, and or a remote positional unit may be placed at a target location.

In some embodiments, the remote positional unit, remote interface, or target node may be made of durable polymer or plastic, large enough to fit into a hand. The remote positional unit, remote interface, or target node may have an external antenna. The remote positional unit, remote interface, or target node may be secured to, e.g., a helicopter, a fixed wing carrier, an object to be transported, by magnets, bolts, or any other securement mechanism. The remote positional unit, remote interface, or target node may be dropped to a location on the ground or secured to, e.g., a life preserver or other flotational device, a rescuer, a load to be picked up, a location for a load to be delivered, or an operational specific location.

Aspects of the load control system logical components 1301 and/or remote interface logical components 1350 may be embodied in a specialized or special purpose computing device or data processor that is specifically programmed, configured, or constructed to perform one or more computer-executable instructions explained in detail herein. Aspects of load control system logical components 1301 and/or remote interface logical components 1350 may also be practiced in distributed computing environments where tasks or modules are performed by remote processing devices that are linked through a communications network, such as a local area network (LAN), wide area network (WAN), or the Internet. In a distributed computing environment, modules may be located in both local and remote memory storage devices. As schematically illustrated in FIG. 13, load control system logical components 1301 and remote interface logical components 1350 may be coupled by a wired or wireless network.

Figure 14:
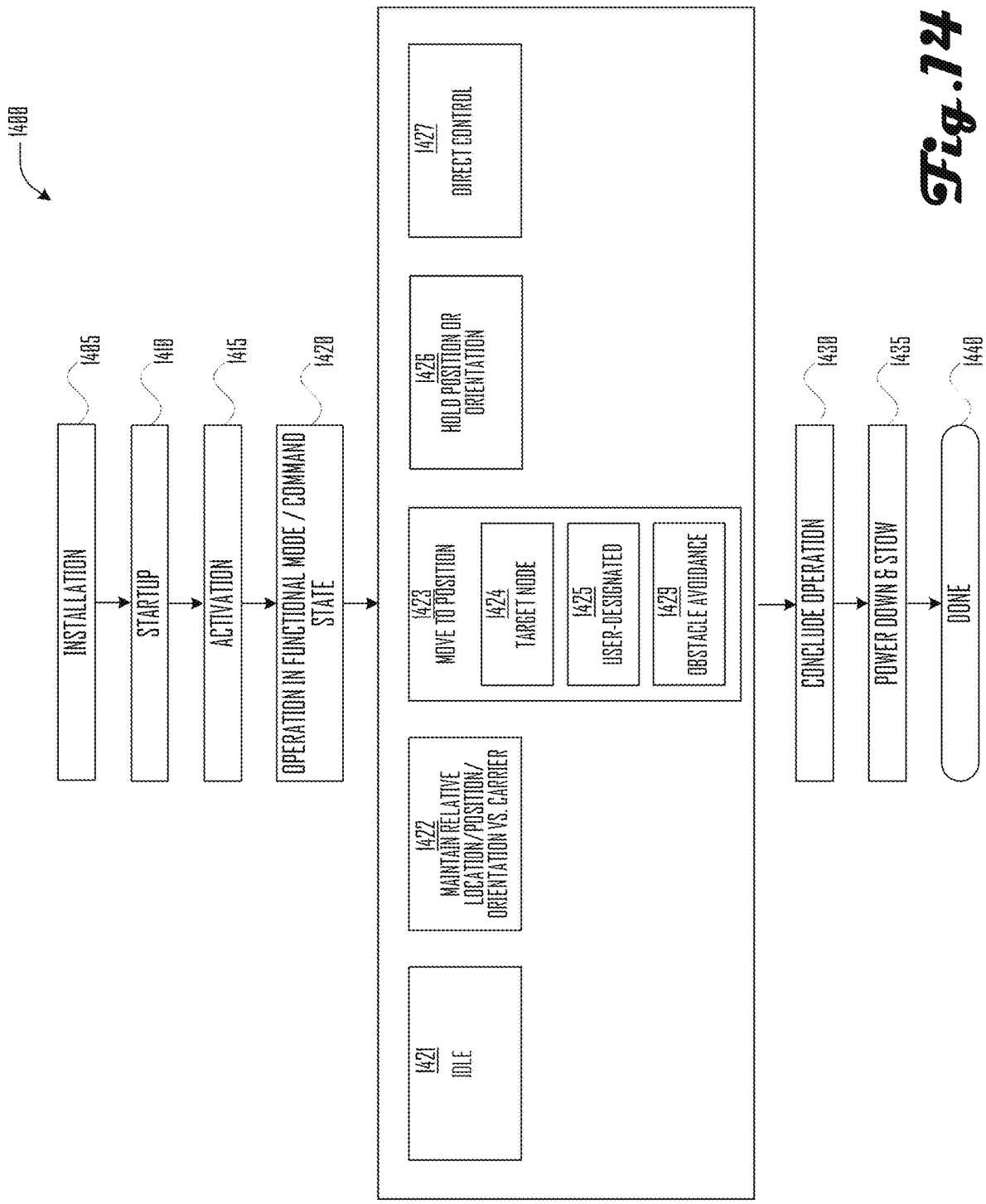
FIG. 14 illustrates a suspended load control system operational module for use with a bidirectional thrust assembly, including multiple modes or command states in accordance with one embodiment.

FIG. 14 illustrates an example of operational module 1400 of a suspended load control system ("SLCS") including multiple mode or command state modules in accordance with one embodiment. Instructions of, or which embody, decision and operational module 1400 may be stored in, for example, memory 1325, and may be executed or performed by, for example, processor 1320, as well as by electrical circuits, firmware, and other computer and logical hardware of SLCS with which operational module 1400 may interact. In embodiments, computer processors and memory to perform some or all of operational module 1400 may be remote from SLCS, such as in an auxiliary computer in, for example, a carrier.

In block 1405, a suspended load control system apparatus may be installed onto a load and/or onto a cable from which a load will be suspended. The suspended load control system apparatus need not be powered on for installation.

In block 1410, the suspended load control system ("SLCS") in the apparatus may be started up and operational module 1400 activated. In some embodiments, operational module 1400 may be initialized by the press of a button located on a face of a control module of the SLCS. Near the accessible external button which may initialize operational module 1400, another button may be present that allows for immediate shut down when pressed. In addition to the initialization interface on the center or control module, operational module 1400 may also be initialized by an operator not directly next to the system. One or more external operators, including but not limited to a rescuer on the end of the cable, may initialize operational module 1400 by pressing a button on one or more remote interface linked wirelessly to operational module 1400. One or more modules of a complete SLCS, such as physically separated control unit, fan unit, and the like (as illustrated in, for example, FIG. 27), may be started up in block 1410 and may be paired to function together. During block 1410, operational module 1400 may determine a relative orientation of fan units which operational module 1400 is to control. This determination may be based on sensor information from the fan units, such as a compass heading sampled from each fan unit. This determination may be performed to adjust for fan units which are not parallel to one another, as may be the case when a modular SLCS is deployed on an irregular load, such as a rope or webbing enclosed load, and the fan units may not be parallel. This determination may be used in block 1530, with respect to fan mapping. This determination may not be necessary when the SLCS is in a rigid frame and the fan units may be presumed to be parallel to one another. This determination may produce an error condition if the fan units are not within an acceptable orientation range.

In block 1415, operational module 1400 is activated in and/or receives a functional mode or command state selected by the operator. In block 1420, operational module 1400 may perform or call suspended load control decision and thrust control module 1500 as a subroutine or submodule, to implement a functional mode or command state. The functional modes or command states of the system may comprise:

Idle mode 1421: internal systems of the SLCS are operating (e.g., operational module 1400 observes motion of the SLCS and calculates corrective action), but the thrusters are shut off or maintain an idle speed only, without action to affect the motion of the load.

Maintain relative position vs. ownship mode 1422: stabilizes the SLCS with respect to a slung origin point. For example, when SLCS is suspended with a load below a helicopter, SLCS will stay directly below the helicopter. Maintain relative position vs. ownship mode 1422 localizes the ownship motion and performs the corrective actions necessary to critically damp any other suspended load motion. If the ownship is traveling at a low speed, maintain relative position vs. ownship mode 1422 will couple the velocity so the two entities are moving in unison. Upon a disturbance to the load, maintain relative position vs. ownship mode 1422 provides thrust in the direction of the disturbance to counteract the disturbance, eliminating the swing.

Move to/stop at position mode 1423: will stabilize an SLCS to a fixed position, counteracting the influence of the weather or small movements of the helicopter or other suspending platform. This mode has the effect of killing all motion. The operator may send the desired target position to SLCS via a remote interface. This may be accomplished in at least two ways:

Target node position 1424: The operator may place reference location sensors 1368 at a desired location or target. Reference location sensors 1368 may communicate wirelessly with target node position 1424 module to indicate the desired position, and target node position 1424 module responds by maneuvering the SLCS to the desired location. Remote interface display 1361 may receive and display the location information of both entities.

User-designated position/orientation 1425: The operator may use the remote interface display 1361 to send a designated position (e.g., latitude and longitude coordinates) or orientation as a commanded location to user-designated position/orientation 1425 module. The system will then steadily direct the suspended load to the desired position or to the desired orientation. The system will simultaneously send feedback to remote interface logical components 1350 regarding position, distance, and orientation information.

Hold position mode 1426: will resist all motion of an SLCS and maintain current position and/or orientation independent of the ownship's motion. This module has the effect of killing all motion. This module has conditional responses respectively to ownship speed, safety factors, and physical constraints.

Direct control mode 1427: Joystick operation of an SLCS in three degrees of freedom. Though operational module 1400 is entirely closed loop and does not require external control during operation, there is an option for user control. The operator is able to provide input to direct control mode 1427 module to directly control positioning, rotation, and thruster output level.

Obstacle avoidance module 3800 module: receives and processes sensor information such as to i) to equalize the distance between sensor locations, such as at fan units, and objects, such as obstacles, sensed in the environment or ii) to measure or receive geometry of a load, measure geometry of obstacles sensed in the environment, determine or receive the position, orientation, and motion of the load, and negotiate the load relative to the obstacle. Please see, for example, FIG. 3800 and discussion of obstacle avoidance module 3800.

In block 1430, the operator completes the operation and retrieves SLCS.

In block 1435, operational module 1400 may be shut down by pushing a button on the interactive display or by pressing the button on the center module of the SLCS apparatus. If the SLCS apparatus includes collapsible frame, propulsion arms or fan units, they may be folded up. If the SLCS apparatus includes removable modules, such as for fan units, a housing, a power supply housing, and the like, the modules may be removed from a load, disassembled. The load may be detached from a load hook or the like, and then a suspension cable may be detached from a hoist ring at the top of the load and/or SLCS. SLCS may then be stowed in and or electrically coupled to charger and/or any suitable location.

Figure 15:
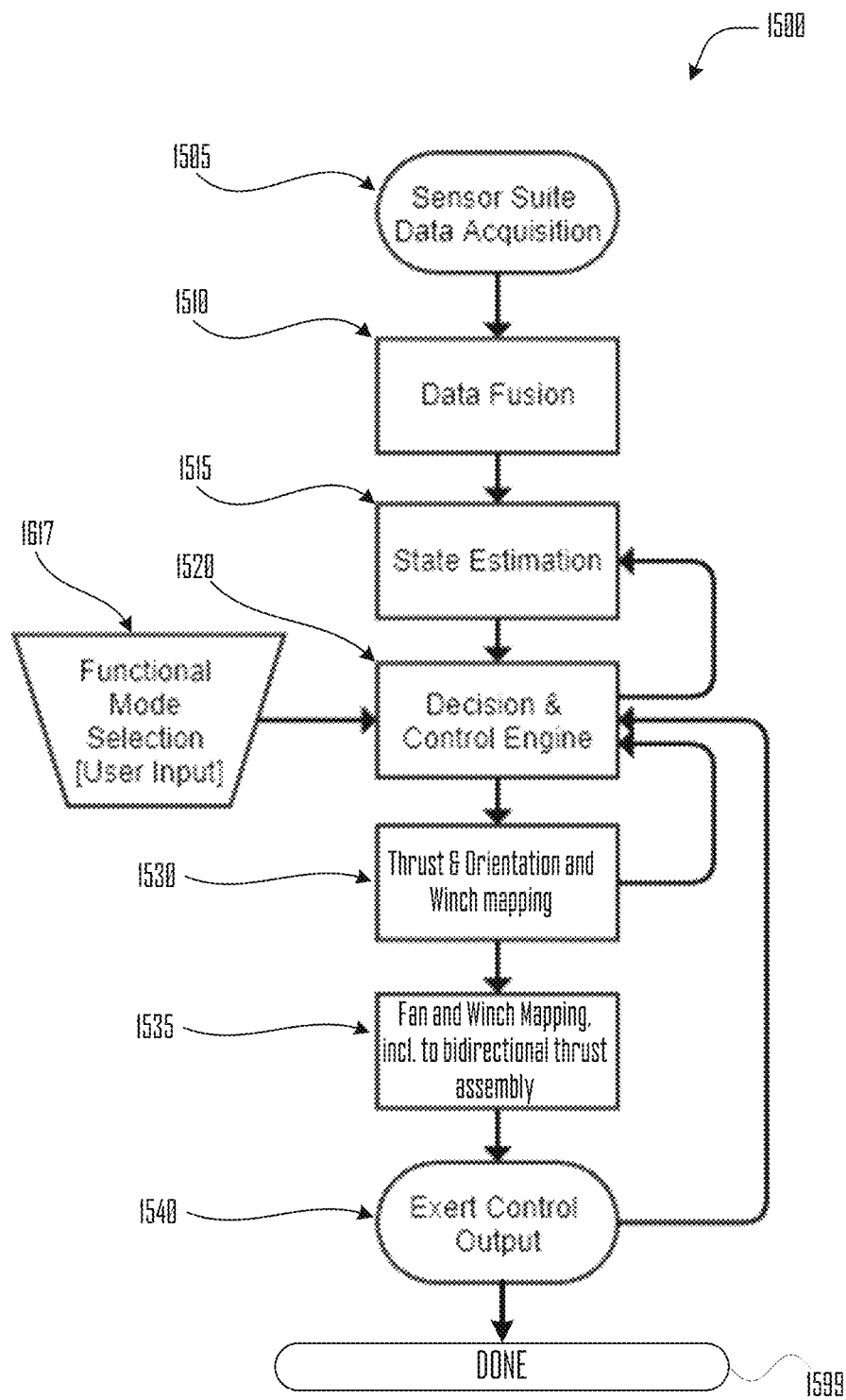
FIG. 15 illustrates a suspended load control system decision and thrust control module for use with a bidirectional thrust assembly, in accordance with one embodiment.

FIG. 15 illustrates a decision and thrust control module 1500 of a suspended load control system in accordance with one embodiment. Instructions of, or which embody, decision and thrust control module 1500 may be stored in, for example, memory 1325, and may be executed or performed by, for example, processor 1320, as well as by electrical circuits, firmware, and other computer and logical hardware of SLCS with which decision and thrust control module 1500 may interact. In embodiments, computer processors and memory to perform some or all of decision and thrust control module 1500 may be remote from SLCS, such as in an auxiliary computer in, for example, a carrier.

Decision and thrust control module 1500 may operate in a closed loop to understand its position and motion in near real time, determine a most desired system response, and send desired response(s) to the air propulsion system thruster array to mitigate swing of the cable or otherwise control a load during operations At block 1505, decision and thrust control module 1500 may obtain data from sensors such as, for example, sensors 1305, such as accelerometer, gyroscope, magnetometer, GPS, lidar/radar, machine vision, and/or range finders.

In block 1510, decision and thrust control module 1500 combines data from the sensors to obtain a data fusion describing position, orientation, motion, and environment of the SLCS apparatus.

Sensor data is fused and filtered by the SLCS through non-linear flavors of a Kalman Filter to yield an accurate representation of the system's state. Closed-loop control methods including fuzzy-tuned proportional, integral, and derivative feedback controllers have bidirectional communication with advanced control methods including deep learning neural nets and future propagated Kalman filters, allowing for further real-time system identification.

In block 1515, decision and thrust control module 1500 performs state estimation using non-linear state estimators to project near-term future motion based on the data fusion and on feedback from the decision and control engine to the state estimator.

In block 1517, decision and thrust control module 1500 receives a functional mode selection, such as according to user input.

In block 1520, decision and thrust control module 1500 takes the state estimation 1515, informed by the user-selected functional mode or command state 1517, as well as additional feedback from the thrust and orientation mapping 1525 and output control 1535, and determines a desired direction of motion or rotation of the SLCS.

Algorithmic output is sent to motion or power controllers, such as ESCs, which will send the desired thrust response to the EDF via, for example phase control of pulse modulated power signals. The net thrust output is mapped in real-time through encoders and load cells then sent back to decision and control block 1520 and onward for closed-loop control.

In block 1525, decision and thrust control module 1500 maps desired orientation with thrust vectors from EDF to generate a thrust and orientation mapping to achieve the determined thrust and orientation of the SLCS apparatus.

In block 1530, decision and thrust control module 1500 maps the thrust and orientation mapping to fan thrust vectors and generates a fan mapping to control EDFs to achieve the desired thrust and orientation of the SLCS.

The fan mapping may comprise a fan that is not to rotate. A fan which is not to rotate may be braked, such as through engagement of solenoid 210.

In controlling EDFs and generating the fan mapping, decision and thrust control module 1500 may map a thrust vector desired to be output from an EDF.

In block 1535, decision and thrust control module 1500 applies the fan mapping to output power control signals to the fans or thrusters (or electronic components controlling the same) to achieve the determined thrust and orientation of the SLCS apparatus, exerting commanded control output and implementing a dynamic response in the form of thrust from the fans. When fans are part of a bidirectional thrust assembly, output power control signals to a motor, such as motor 400, may include a direction of rotation of the motor, to selectively transmit torque to a fan mapped in block 1530.

At done block 1599, decision and thrust control module 1500 may conclude or return to a module which may have called it.

Decision and thrust control module 1500 may be unmanned and automated aside from the high-level operator-selected functional control modes. Net output is a control force to move or stabilize a suspended load, wherein the force may be achieved through activation of one or more bidirectional thrust assembly.

Figure 16:
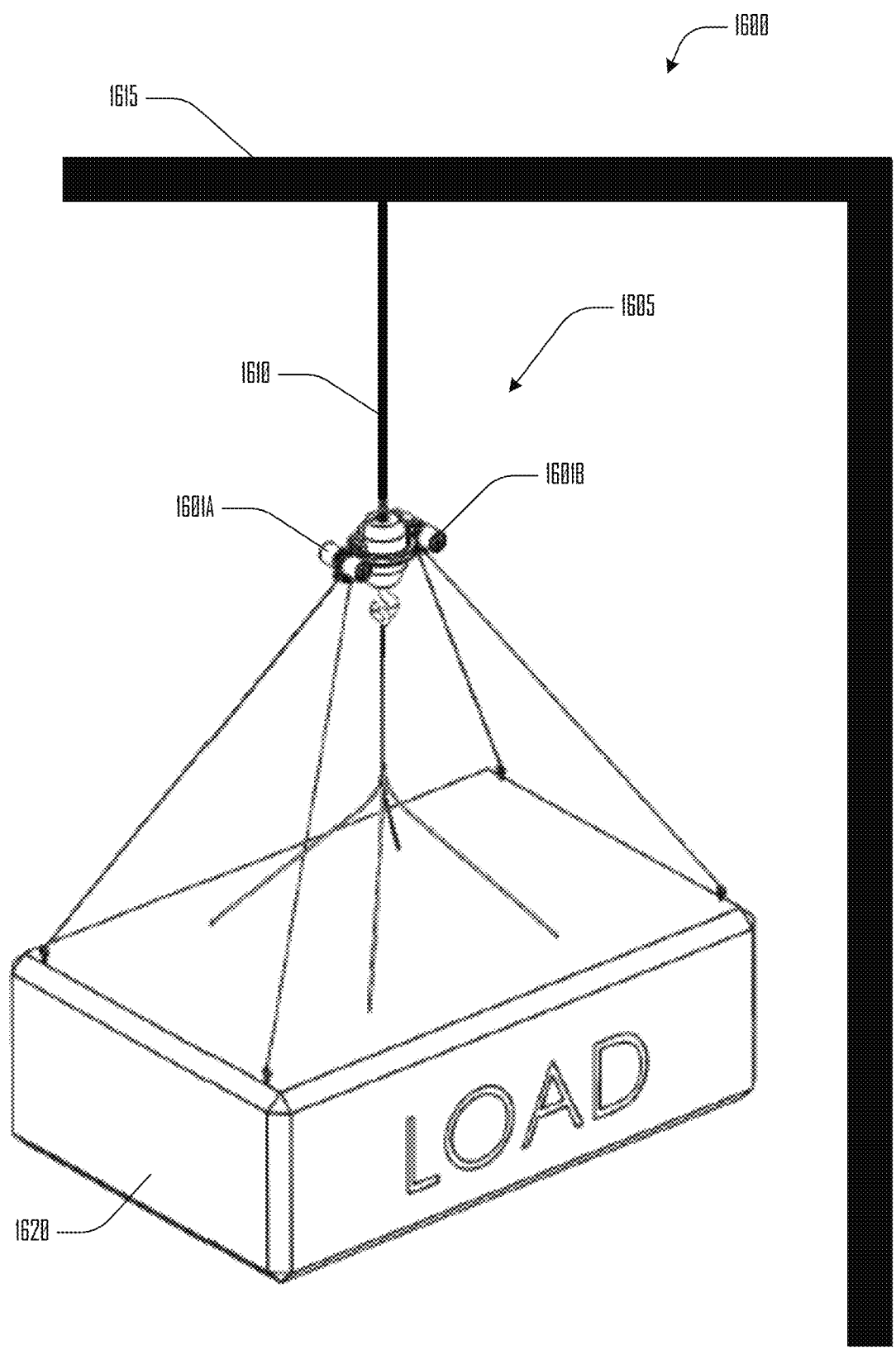
FIG. 16 illustrates a view of a first example of a suspended load control system comprising a bidirectional thrust assembly secured to a load, in accordance with an embodiment.
Figure 17:
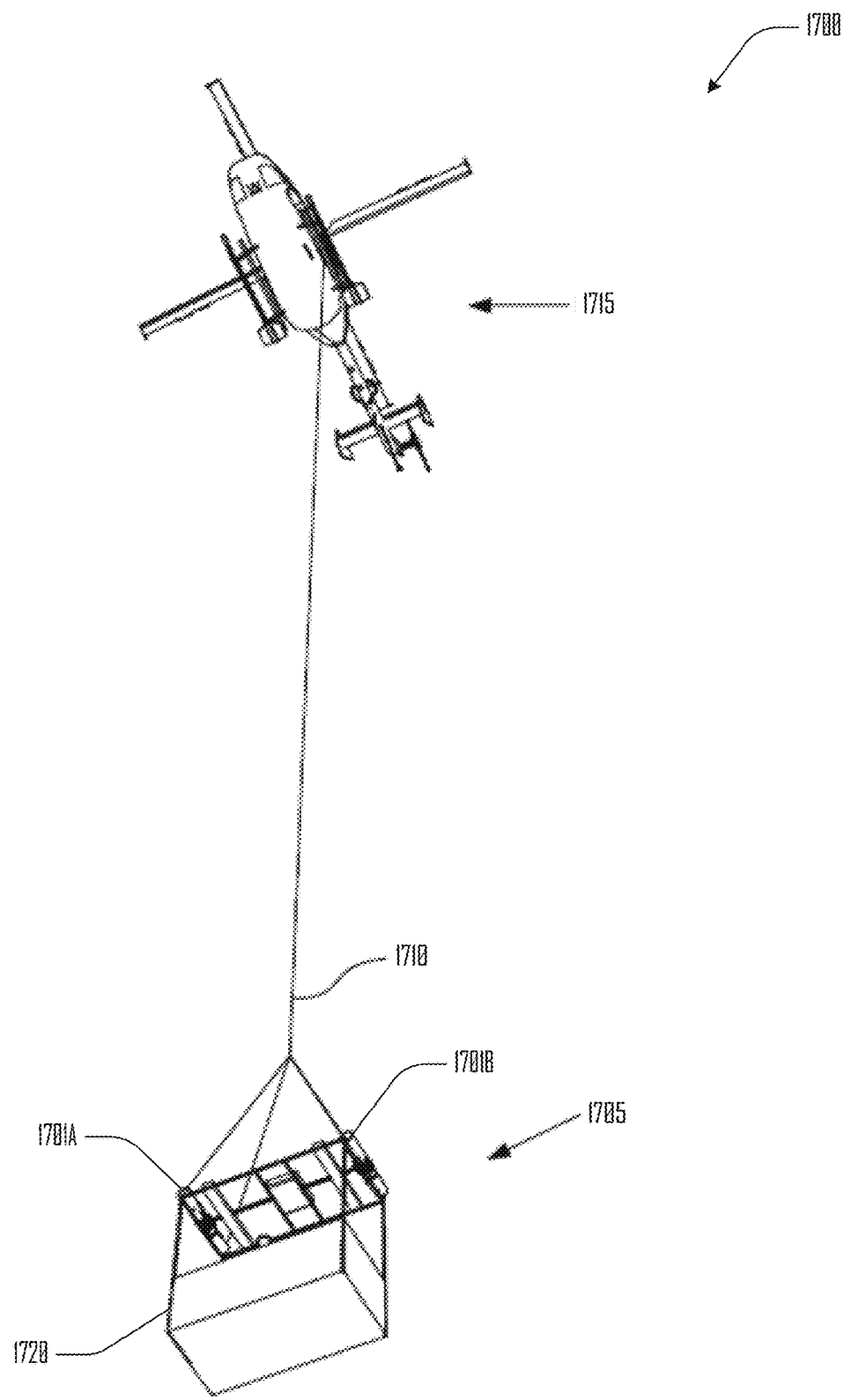
FIG. 17 illustrates a perspective view of a second example of a suspended load control system comprising a bidirectional thrust assembly secured to a load, in accordance with an embodiment.
Figure 18:
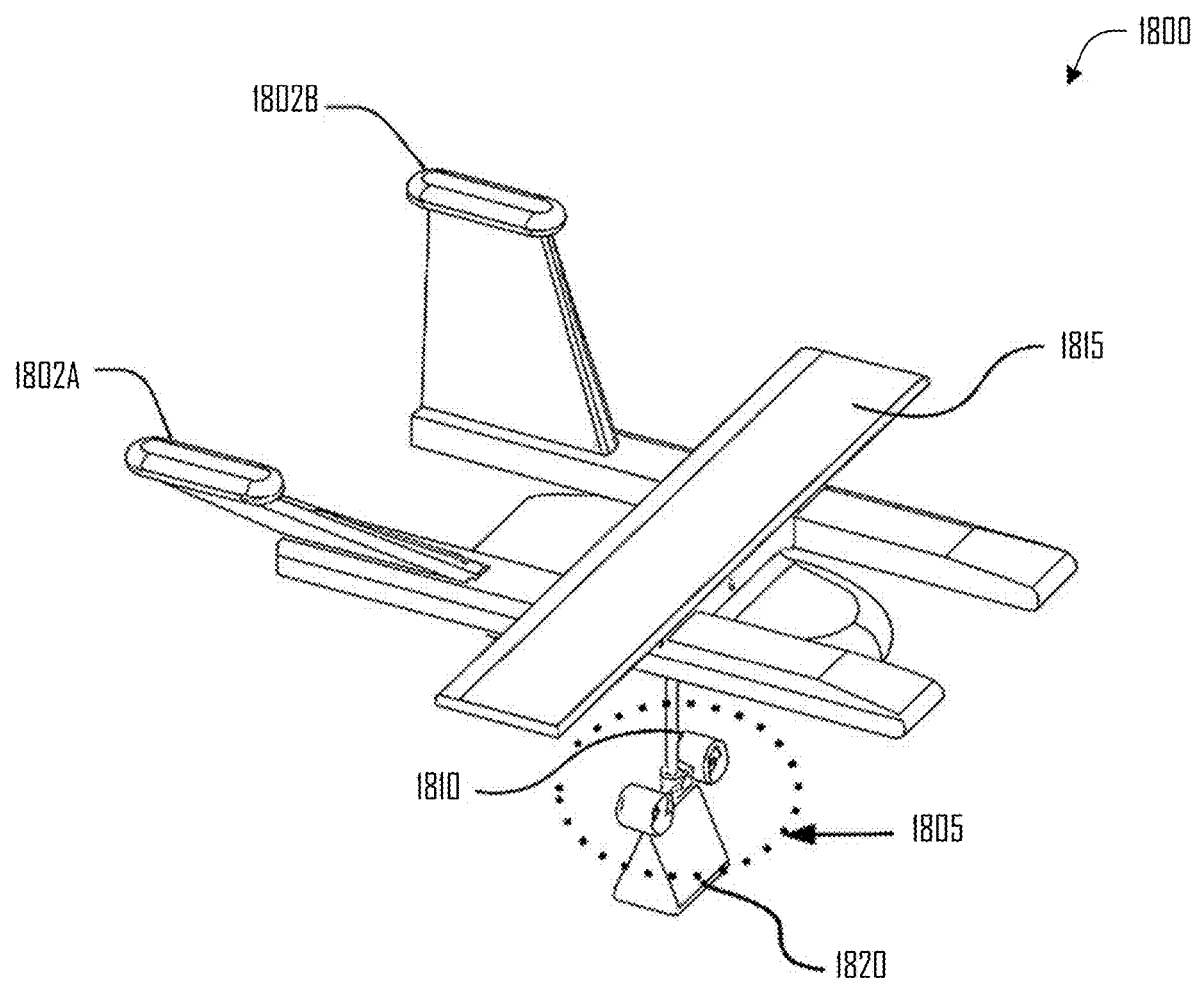
FIG. 18 illustrates a perspective view of a third example of a suspended load control system comprising a bidirectional thrust assembly secured to a load, in accordance with an embodiment.

Examples illustrating use of a bidirectional thrust assembly may be found in FIG. 16, FIG. 17, and FIG. 18; these examples are not exhaustive. Additional embodiments comprise bidirectional thrust assemblies in watercraft, in lighter-than-air craft, and the like.

In the example illustrated in FIG. 16, SLCS 1605 comprises bidirectional thrust assembly 1601A and bidirectional thrust assembly 1601B, and hangs on suspension cable 1610 below carrier 1615, which may be, for example, a crane. SLCS 1605 comprising one or more bidirectional thrust assembly may be used to control load 1620, including through use of a thrust control module.

In the example illustrated in FIG. 17, SLCS 1705 comprises bidirectional thrust assembly 1701A and bidirectional thrust assembly 1701B, and hangs on suspension cable 1710 below carrier 1715, which may be, for example, a helicopter. SLCS 1705 comprising one or more bidirectional thrust assembly may be used to control load 1720, including through use of a thrust control module.

In the example illustrated in FIG. 18, SLCS 1805 comprises bidirectional thrust assembly 1801A and bidirectional thrust assembly 1801B, and hangs on suspension cable 1810 below carrier 1815, which may be, for example, a vertical takeoff and landing vehicle, an aerial drone or the like. Carrier 1815 may comprise bidirectional thrust assembly 1802A and bidirectional thrust assembly 1802B.

SLCS 1805 comprising one or more bidirectional thrust assembly may be used to control load 1820 while a vehicle, such as carrier 1815, may comprise one or more bidirectional thrust assembly for maneuvering and or thrust purposes, including through use of a thrust control module.

Figure 19:
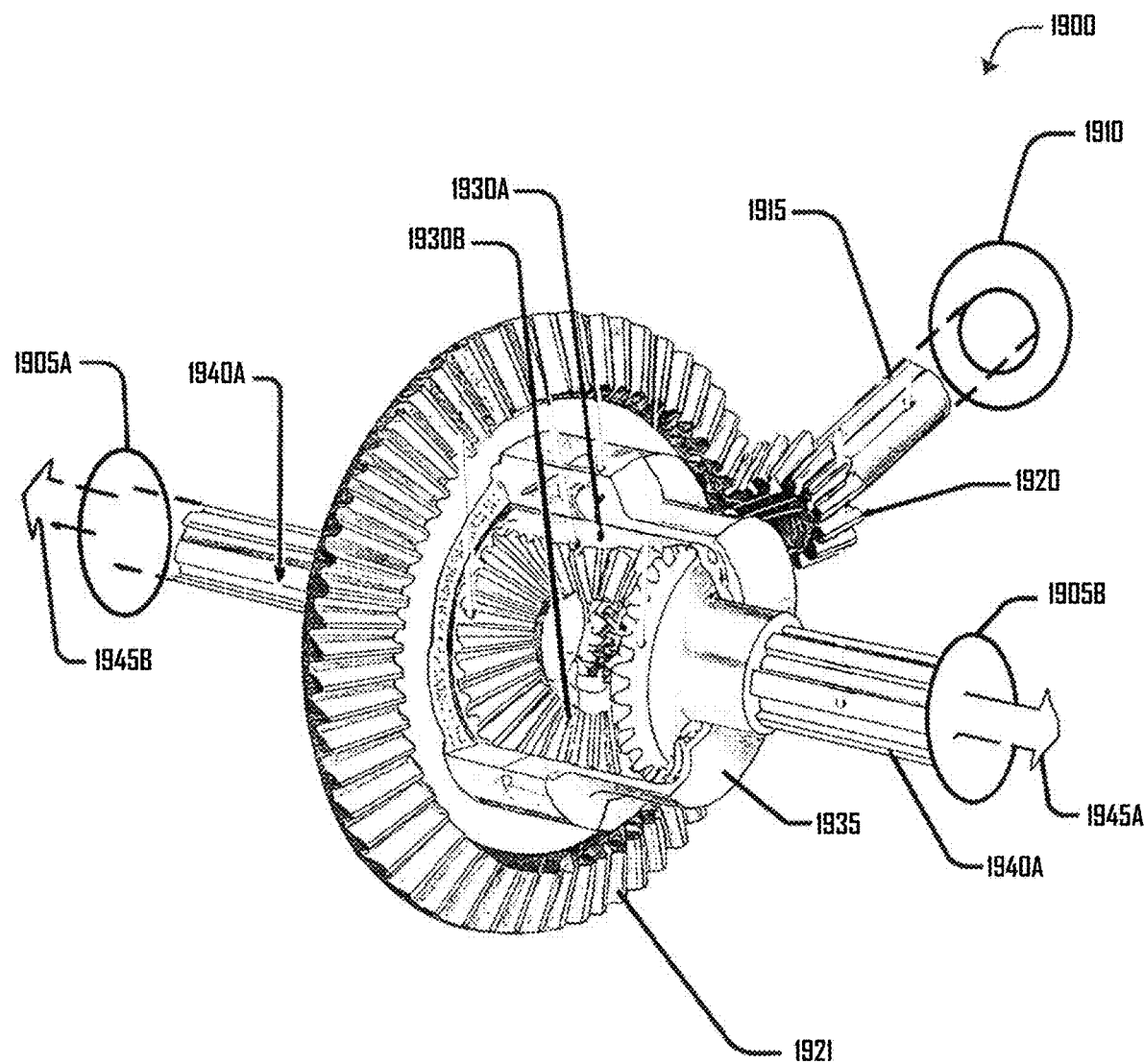
FIG. 19 illustrates an additional example of a bidirectional thrust assembly, in accordance with several embodiments.

FIG. 19 illustrates an additional example of a bidirectional thrust assembly 1900, in accordance with several embodiments, which may be understood as a differential transmission.

In FIG. 19, motor 1910 produces power, such as torque, which may be output via rotation of shaft 1915 in a direction. Drive pinion 1920 transfers power to case ring gear 1921. Case ring gear 1921 is continuous with or an integral part of gear case 1935. Rotation of case ring gear 1921 causes case 1935 to rotate. Internal pinions 1930A and 1930B are free to around bearings which secure them to case 1935.

Output shafts 1940A and 1940B exit through case 1935 on bearings and may rotate separately from case 1935. Output shafts 1940A and 1940B are secured to clutches or freewheels 1905A and 1905B. Clutches or freewheels 1905A and 1905B are secured to fans 1945A and 1945B, such as unidirectional fans, such as fan 700A and 700B.

Rotation of case 1935, such as by torque from motor 1910, causes internal pinions 1930A and 1930B to rotate about a central axis of output shafts 1940A and 1940. If the load on output shafts 1940A and 1940B were to be equal, internal pinions 1930A and 1930B would not rotate about the bearing securing them to case 1935, though would rotate about the central axis of output shafts 1940A and 1940 and would cause output shafts 1940A and 1940B to rotate in a same direction. Because rotation of both output shafts 1940A and 1940B may not be desirable, such as if both fans 1945A and 1945B are not desired to rotate and develop thrust at the same time, clutches or freewheels 1905A and 1905B selectively prevent or allow power transfer to one or both fans 1945A and 1945B.

In embodiments, clutches or freewheels 1905A and 1905B may be, for example, freewheel assemblies, such as freewheel assembly 208, which may be free to rotate in opposite directions; e.g. clutch or freewheel 1905A may allow rotation in a clockwise direction whereas clutch or freewheel 1905B may allow rotation in a counterclockwise direction (when viewed from one direction, down output shaft 1940). In this embodiment, rotation of motor 1910 in a first direction will passively transfer torque through the differential transmission to a first fan causing the first fan to rotate and develop thrust and bypassing power transmission to a second fan; in this embodiment, rotation of motor 1910 in a second direction will passively transfer torque through the differential transmission to the second fan, causing the second fan to rotate and develop thrust and bypassing power transmission to the first fan.

In embodiments, clutches or freewheels 1905A and 1905B may be, for example, clutches which may be engaged or disengaged to transfer or not transfer power, such as torque, from motor 1910, one of output shaft 1940A or 1940B, to fans 1945A or 1945B. In embodiments in which clutches or freewheels 1905A and 1905B are clutches, the clutches may be actively engaged or disengaged by a clutch activation mechanism, such as by a solenoid or the like. Such an active engagement mechanism may obtain power from, for example, an electrical connection via slip rings or the like on output shafts 1940A and or 1940B. In embodiments in which clutches or freewheels 1905A and 1905B are clutches, the clutches may be passively engaged or disengaged by a clutch activation mechanism, such as by a direction of rotation and inertia, in a similar manner to pawl engagement mechanism 506, pocket 510, and pawl wheel 500, via hydraulic clutch activation mechanisms, and the like.

In embodiments, motor 1910 may rotate in one direction, without changing a direction of rotation. In such embodiments, clutches or freewheels 1905A and 1905B may be actively engaged, to prevent some or all power transfer to one or both of fans 1945A and 1945B.

Fans 1945A and or 1945B may be unidirectional fans, configured, for example, to output thrust vectors in opposite directions. Fans 1945A and or 1945B may be configured to output thrust vectors in opposite directions when rotated in a same or in opposite directions.

FIG. 20 illustrates an example of motor 2005 secured to fans within outlet ports 2020, which may be part of a bidirectional thrust apparatus, system, and method, as disclosed herein. Fans within outlet ports 2020 may be, for example, unidirectional fans. A heat sink may comprise vanes 2010 projecting out from motor into fluid, such as thrust fluid drawn to fans within outlet ports 2020. Frames 1015A and 1015B may support motor 2005 between outlet ports 2020 and or within a case, similar to case 102, which may include a fluid inlet, similar to fluid inlet 104. Frames 1015A and 1015B may be continuous with and or secured to vanes 2010. The case, similar to case 102, may be secured to an external margin of vanes 2010. Vanes 2010 may be similar to radiator fin 410. Motor 2005 may be similar to motor 400. Windings of motor 2005 may be proximate to vanes 2010; permanent magnets of motor 2005 may be proximate to an axle leading to fans within outlet ports 2020; heat produced in the windings, proximate to vanes 2010, may radiate or otherwise be conducted out of motor 2005 into surrounding fluid, such as thrust fluid. Freewheel assemblies, similar to freewheel assemblies 208, may be present, such that motor 2005 secured to fans within outlet ports 2020 operates as a bidirectional thrust assembly, as discussed herein. Vanes 2010 may comprise internal channels or conduits containing a liquid, such as water, water with propylene glycol, or the like, wherein the liquid may passively or actively flow into a radiator on an exterior of a case and transport heat away from motor 2005.

In this way, a heat sink may exhaust heat from a motor particularly where, as herein, the motor may operate at a high duty cycle, because it is powering two fans, rather than just one.

The apparatuses and methods in this disclosure are described in the preceding on the basis of several preferred embodiments. Different aspects of different variants are considered to be described in combination with each other such that all combinations that upon reading by a skilled person in the field on the basis of this document may be regarded as being read within the concept of the disclosure. The preferred embodiments do not limit the extent of protection of this document.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

As used herein "releasable", "connect", "connected", "connectable", "disconnect", "disconnected," and "disconnectable" refers to two or more structures which may be connected or disconnected, generally without the use of tools (examples of tools including screwdrivers, pliers, drills, saws, welding machines, torches, irons, and other heat sources) or with the use of tools but in a repeatable manner (such as through the use of nuts and bolts or screws). As used herein, "attach," "attached," or "attachable" refers to two or more structures or components which are attached through the use of tools or chemical or physical bonding, but wherein the structures or components may not generally be released or re-attached in a repeatable manner. As used herein, "secure," "secured," or "securable" refers to two or more structures or components which are connected or attached.

Having thus described embodiments of the present disclosure of the present application in detail and by reference to illustrative embodiments thereof, it will be apparent that modifications and variations are possible without departing from the scope of the present disclosure.

Following are non-limiting examples.

Example 1. A bidirectional thrust assembly comprising: a motor, a driveshaft, a first fan and a second fan, a selective power transfer mechanism, wherein the selective power transfer mechanism is to transfer torque from the motor to either the first fan or the second fan.

Example 2. The bidirectional thrust assembly according to Example 1, wherein the motor is operable in a first direction of rotation and a second direction of rotation, wherein the first direction of rotation causes the selective power transfer mechanism to transfer torque from the motor to the first fan and wherein the second direction of rotation causes the selective power transfer mechanism to transfer torque from the motor to the second fan.

Example 3. The bidirectional thrust assembly according to Example 2, wherein a change in direction of rotation of the motor between the first direction of rotation and the second direction of rotation is to passively cause the selective power transfer mechanism to change torque transfer between the first fan and the second fan.

Example 4. The bidirectional thrust assembly according to Example 2, wherein the first fan and the second fan are unidirectional fans configured to propel thrust fluid and develop thrust in opposite directions.

Example 5. The bidirectional thrust assembly according to Example 3, wherein to passively cause the selective power transfer mechanism to change torque transfer between the first fan and the second fan is to cause the selective power transfer mechanism to change torque transfer between the first fan and the second fan without an independently powered actuator.

Example 6. The bidirectional thrust assembly according to Example 2, wherein power for the selective power transfer mechanism is provided exclusively by the motor.

Example 7. The bidirectional thrust assembly according to Example 1, wherein the power transfer mechanism comprises a first freewheel assembly between the driveshaft and the first fan and a second freewheel assembly between the driveshaft and the second fan.

Example 8. The bidirectional thrust assembly according to Example 7, wherein the first freewheel assembly and the second freewheel assembly engage or disengage with the motor based on a direction of rotation of the motor to cause the selective power transfer mechanism to transfer torque from the motor to either the first fan or the second fan.

Example 9. The bidirectional thrust assembly according to Example 7, wherein the first freewheel assembly comprises a pawl and a ratchet tooth.

Example 10. The bidirectional thrust assembly according to Example 9, wherein the pawl is to selectively engage with the ratchet tooth in response to a rotation of the motor in a first direction.

Example 11. The bidirectional thrust assembly according to Example 10, wherein the pawl is to selectively disengage with the ratchet tooth in response to a rotation of the motor in a second direction.

Example 12. The bidirectional thrust assembly according to Example 9, wherein the first freewheel assembly comprises a pawl engagement mechanism.

Example 13. The bidirectional thrust assembly according to Example 12, wherein the pawl engagement mechanism comprises a spring, wherein the spring drives the pawl into the ratchet tooth in response to a rotation of the motor in a direction of rotation, wherein the ratch tooth transfers torque from the pawl to the driveshaft.

Example 14. The bidirectional thrust assembly according to Example 12, wherein an inertia of the pawl engagement mechanism and a path for the pawl engagement mechanism within the first freewheel assembly causes the pawl engagement mechanism to engage or disengage with the pawl and to thereby engage or disengage the pawl with the ratchet tooth.

Example 15. The bidirectional thrust assembly according to Example 14, wherein a direction of rotation of the motor interacts with the inertia of the pawl engagement mechanism and the path for the pawl engagement mechanism within the first freewheel assembly to cause the pawl engagement mechanism to engage or disengage with the pawl and to thereby engage or disengage the pawl with ratchet tooth.

Example 16. The bidirectional thrust assembly according to Example 1, wherein the driveshaft is a double ended driveshaft, wherein the double ended driveshaft passes through a center of the motor.

Example 17. The bidirectional thrust assembly according to Example 16, wherein a first end of the double ended driveshaft is to engage with a first end of the selective power transfer mechanism, wherein the first end of the selective power transfer mechanism is to engage with the first fan, wherein a second end of the double ended driveshaft is to engage with a second end of the selective power transfer mechanism, wherein the second end of the selective power transfer mechanism is to engage with the second fan.

Example 18. The bidirectional thrust assembly according to Example 1, wherein a change in direction of rotation of the motor causes a change in centrifugal force within the selective power transfer mechanism and wherein the change in centrifugal force within the selective power transfer mechanism causes the selective power transfer mechanism to change torque transfer between the first fan and the second fan.

Example 19. The bidirectional thrust assembly according to Example 1, wherein the first fan and the second fan are to rotate about a common axis of rotation.

Example 20. The bidirectional thrust assembly according to Example 1, wherein the first fan and the second fan are to propel thrust fluid in opposing directions.

Example 21. The bidirectional thrust assembly according to Example 1, wherein the first fan and the second fan are unidirectional fans, wherein the unidirectional fans comprise blades with an asymmetric profile, wherein the asymmetric profile produces greater thrust when rotated in one direction.

Example 22. The bidirectional thrust assembly according to Example 1, further comprising a case, wherein the case surrounds the first fan, the second fan, the driveshaft, and the selective power transfer mechanism.

Example 23. The bidirectional thrust assembly according to Example 22, wherein the case comprises a thrust fluid inlet.

Example 24. The bidirectional thrust assembly according to Example 1, further comprising a computer processor and memory, wherein the memory comprises a thrust control module which, when executed by the computer processor, is to control the motor to selectively output thrust through the first fan and the second fan to influence a motion of the bidirectional thrust assembly.

Example 25. The bidirectional thrust assembly according to Example 24, further comprising a sensor suite, and wherein the thrust control module, when executed by the computer processor, is to determine a position, orientation, or motion of the bidirectional thrust assembly based on a sensor data from the sensor suite and is to control the motor to selectively output thrust through the first fan and the second fan according to the position, orientation, or motion to influence at least one of the position, orientation, or motion of the bidirectional thrust assembly.

Example 26. The bidirectional thrust assembly according to Example 24, wherein the bidirectional thrust assembly is a first bidirectional thrust assembly, the motor is a first motor, and further comprising a second bidirectional thrust assembly, wherein the second bidirectional thrust assembly comprises a second motor, and wherein the thrust control module, when executed by the computer processor, controls the first motor and the second motor to impart at least one of a horizontal thrust vector or a torque on the first bidirectional thrust assembly and the second bidirectional thrust assembly.

Example 27. The bidirectional thrust assembly according to Example 25, wherein the thrust control module is to determine the position, orientation, or motion by combining the sensor data from the sensor suite through a non-linear filter to determine a current state.

Example 28. The bidirectional thrust assembly according to Example 27, wherein the thrust control module further is to project near-term future motion based on the current state with feedback from at least one of a functional mode or command state of an operational module, a thrust and orientation mapping, or a fan mapping.

Example 29. The bidirectional thrust assembly according to Example 27, wherein the non-linear filter is a Kalman filter.

Example 30. The bidirectional thrust assembly according to Example 28, wherein the functional mode or command state comprises at least one of idle, maintain relative location or position relative to a carrier, move to a location, hold position, obstacle avoidance, or direct control.

Example 31. The bidirectional thrust assembly according to Example 1, wherein the motor comprises a heat transfer structure.

Example 32. The bidirectional thrust assembly according to Example 31, wherein the heat transfer structure is radially arrayed around the motor in a flow of thrust fluid.

Example 33. The bidirectional thrust assembly according to Example 31, wherein the motor comprises magnets proximate to the driveshaft, windings distal to the driveshaft, and wherein heat produced in the windings transfers to the heat transfer structure and to a thrust fluid surrounding the motor.

Example 34. The bidirectional thrust assembly according to Example 1, further comprising a brake, wherein the brake is to resist movement of at least one of the first fan or the second fan.

Example 35. The bidirectional thrust assembly according to Example 34, wherein the selective power transfer mechanism is to transfer torque from the motor to a first of the first fan or the second fan and the brake is to arrest movement of a second of the first fan or the second fan.

Example 36. The bidirectional thrust assembly according to Example 35, wherein the brake is to arrest movement of the second of the first fan or the second fan with at least one of a magnetic brake or a friction brake.

Example 37. The bidirectional thrust assembly according to Example 1, wherein the selective power transfer mechanism further comprises a clutch, wherein the clutch is to cause the selective power transfer mechanism is to transfer torque from the motor to a first of the first fan or the second fan and prevent transfer of torque to a second of the first fan or the second fan.

Example 38. The bidirectional thrust assembly according to Example 1, wherein the selective power transfer mechanism further comprises a differential transmission.

Example 39. A method to selectively transfer torque from a motor to either a first unidirectional fan or a second unidirectional fan comprising: operating a motor in a first direction of rotation to transfer torque from the motor through a driveshaft and a selective power transfer mechanism to the first unidirectional fan and operating the motor in a second direction of rotation to transfer torque from the motor through the driveshaft and the selective power transfer mechanism to the second unidirectional fan.

Example 40. The method according to Example 39, further comprising operating the motor in the first direction of rotation to passively transfer torque from the motor through a driveshaft and the selective power transfer mechanism to the first unidirectional fan and operating the motor in the second direction of rotation to passively transfer torque from the motor through a driveshaft and the selective power transfer mechanism to the second unidirectional fan.

Example 41. The method according to Example 40, wherein to passively transfer torque from the motor comprises changing torque transfer between the first unidirectional fan and the second unidirectional fan based only on the first direction of rotation and the second direction of rotation without an independently powered actuator in the selective power transfer mechanism.

Example 42. The method according to Example 39, wherein the first unidirectional fan and the second unidirectional fan are configured to propel thrust fluid and develop thrust in opposite directions.

Example 43. The method according to Example 39, wherein the selective power transfer mechanism comprises a first freewheel assembly between the driveshaft and the first unidirectional fan and a second freewheel assembly between the driveshaft and the second unidirectional fan.

Example 44. The method according to Example 43, wherein the motor is operated in the first direction of rotation and the first freewheel assembly engages with the driveshaft to transfer torque from the motor to the first unidirectional fan and wherein the motor is operated in the second direction of rotation and the second freewheel assembly engages with the driveshaft to transfer torque from the motor to the second unidirectional fan.

Example 45. The method according to Example 43, wherein the first freewheel assembly comprises a pawl and a ratchet tooth.

Example 46. The method according to Example 45, further comprising engaging the pawl with the ratchet tooth by rotating the motor in the first direction.

Example 47. The method according to Example 45, further comprising disengaging the pawl with the ratchet tooth by rotating the motor in the second direction.

Example 48. The method according to Example 39, wherein the driveshaft is a double ended driveshaft, wherein the double ended driveshaft passes through a center of the motor.

Example 49. The method according to Example 39, wherein the first unidirectional fan and the second unidirectional fan rotate about a common axis of rotation.

Example 50. The method according to Example 39, further comprising propelling thrust fluid in opposing directions with the first unidirectional fan and the second unidirectional fan.

Example 51. The method according to Example 39, wherein the first unidirectional fan and the second unidirectional fan comprise blades with an asymmetric profile.

Example 52. The method according to Example 39, further comprising drawing thrust fluid for the first unidirectional fan and the second unidirectional fan into a case, wherein the case surrounds the first unidirectional fan, the second unidirectional fan, the driveshaft, and the selective power transfer mechanism.

Example 53. The method according to Example 52, further comprising drawing thrust fluid for the first unidirectional fan and the second unidirectional fan into a thrust fluid inlet in the case, wherein the thrust fluid inlet is a radial inlet centrally located between the first unidirectional fan and the second unidirectional fan.

Example 54. The method according to Example 39, further comprising controlling the motor with a computer processor, wherein the computer processor obtains instructions from a memory, and, with the instructions and the computer processor, controlling the motor to selectively output thrust through the first unidirectional fan and the second unidirectional fan to influence a motion of a load secured to a housing, wherein the housing is secured to the computer processor, the memory, the motor, the driveshaft, the first unidirectional fan and the second unidirectional fan.

Example 55. The method according to Example 54, further comprising with the instructions and the computer processor, determining a position, orientation, or motion of the load with a sensor data from a sensor suite and controlling the motor to selectively output thrust through the first unidirectional fan and the second unidirectional fan according to the position, orientation, or motion to influence at least one of the position, orientation, or motion of the load.

Example 56. The method according to Example 55, further comprising with the instructions and the computer processor, determining the position, orientation, or motion of the load by combining the sensor data from the sensor suite through a non-linear filter to determine a current state.

Example 57. The method according to Example 56, wherein the non-linear filter is a Kalman filter.

Example 58. The method according to Example 56, further comprising with the instructions and the computer processor, projecting near-term future motion based on the current state with feedback from at least one of a functional mode or command state of an operational module, a thrust and orientation mapping, or a fan mapping.

Example 59. The method according to Example 58, wherein the functional mode or command state comprises at least one of idle, maintain relative location or position relative to a carrier, move to a location, hold position, obstacle avoidance, or direct control.

Example 60. The method according to Example 54, wherein the motor is a first motor, further comprising a second motor between a third unidirectional fan and a fourth unidirectional fan and further comprising with the instructions and the computer processor, controlling the first motor and the second motor to impart at least one of a horizontal thrust vector or a torque on the load.

Example 61. The method according to Example 39, further comprising discharging heat from the motor with a heat transfer structure, wherein the heat transfer structure comprises vanes radially arrayed around the motor in a flow of thrust fluid.

Example 62. The method according to Example 61, wherein the motor comprises magnets proximate to the driveshaft, windings distal to the driveshaft, and further comprising producing heat in the windings and transferring the heat in the windings to the heat transfer structure.

Example 63. The method according to Example 39, further comprising resisting a movement of at least one of the first fan or the second fan with a brake.

Example 64. The method according to Example 63, further comprising selectively transferring torque between a first of the first unidirectional fan or the second unidirectional fan and arresting movement of a second of the first fan or the second fan with the brake.

Example 65. The method according to Example 64, wherein the brake comprises at least one of a magnetic brake or a friction brake.

Example 66. The method according to Example 39, wherein the selective power transfer mechanism comprises a clutch, and further comprising transferring torque from the motor to a first of the first fan or the second fan and preventing transfer of torque to a second of the first fan or the second fan with the clutch.

Example 67. The method according to Example 39, wherein the selective power transfer mechanism comprises a differential transmission, and further comprising transferring torque from the motor to a first of the first fan or the second fan and preventing transfer of torque to a second of the first fan or the second fan with the differential transmission.

Example 68. An apparatus to selectively transfer torque from a motor to either a first unidirectional fan or a second unidirectional fan comprising: means to operate a motor in a first direction of rotation to transfer torque from the motor through a driveshaft and a selective power transfer mechanism to the first unidirectional fan and means to operate the motor in a second direction of rotation to transfer torque from the motor through the driveshaft and the selective power transfer mechanism to the second unidirectional fan.

Example 69. The apparatus according to Example 68, further comprising means to operate the motor in the first direction of rotation to passively transfer torque from the motor through a driveshaft and the selective power transfer mechanism to the first unidirectional fan and means to operate the motor in the second direction of rotation to passively transfer torque from the motor through a driveshaft and the selective power transfer mechanism to the second unidirectional fan.

Example 70. The apparatus according to Example 69, wherein means to passively transfer torque from the motor comprises means to change torque transfer between the first unidirectional fan and the second unidirectional fan based only on the first direction of rotation and the second direction of rotation without an independently powered actuator in the selective power transfer mechanism.

Example 71. The apparatus according to Example 68, further comprising means for the first unidirectional fan and the second unidirectional fan to propel thrust fluid and develop thrust in opposite directions.

Example 72. The apparatus according to Example 68, wherein the selective power transfer mechanism comprises means for a first freewheel assembly between the driveshaft and the first unidirectional fan and a second freewheel assembly between the driveshaft and the second unidirectional fan.

Example 73. The apparatus according to Example 72, wherein the first freewheel assembly comprises means to engage with the driveshaft to transfer torque from the motor to the first unidirectional fan when the motor is operated in the first direction of rotation and the second freewheel assembly comprises means to engage with the driveshaft to transfer torque from the motor to the second unidirectional fan when the motor is operated in the second direction of rotation.

Example 74. The apparatus according to Example 72, wherein the first freewheel assembly comprises means for a pawl and a ratchet tooth.

Example 75. The apparatus according to Example 74, further comprising means to engage the pawl with the ratchet tooth by rotating the motor in the first direction.

Example 76. The apparatus according to Example 74, further comprising means to disengage the pawl with the ratchet tooth by rotating the motor in the second direction.

Example 77. The apparatus according to Example 68, wherein the driveshaft is a double ended driveshaft, wherein the double ended driveshaft passes through a center of the motor.

Example 78. The apparatus according to Example 68, further comprising means for the first unidirectional fan and the second unidirectional fan to rotate about a common axis of rotation.

Example 79. The apparatus according to Example 68, further comprising means to propel thrust fluid in opposing directions with the first unidirectional fan and the second unidirectional fan.

Example 80. The apparatus according to Example 68, wherein the first unidirectional fan and the second unidirectional fan comprise blades with an asymmetric profile.

Example 81. The apparatus according to Example 68, further comprising means to draw thrust fluid for the first unidirectional fan and the second unidirectional fan into a case, wherein the case surrounds the first unidirectional fan, the second unidirectional fan, the driveshaft, and the selective power transfer mechanism.

Example 82. The apparatus according to Example 81, further comprising means to draw thrust fluid for the first unidirectional fan and the second unidirectional fan into a thrust fluid inlet in the case, wherein the thrust fluid inlet is a radial inlet centrally located between the first unidirectional fan and the second unidirectional fan.

Example 83. The apparatus according to Example 68, further comprising means to control the motor with a computer processor, wherein the computer processor comprises means to obtain instructions from a memory, and wherein the instructions comprise means to cause the computer processor to control the motor to selectively output thrust through the first unidirectional fan and the second unidirectional fan to influence a motion of a load secured to a housing, wherein the housing is secured to the computer processor, the memory, the motor, the driveshaft, the first unidirectional fan and the second unidirectional fan.

Example 84. The apparatus according to Example 83, further comprising means to determine with a sensor data from a sensor suite a position, orientation, or motion of the load and means to control the motor to selectively output thrust through the first unidirectional fan and the second unidirectional fan according to the position, orientation, or motion to influence at least one of the position, orientation, or motion of the load.

Example 85. The apparatus according to Example 84, further comprising means to determine the position, orientation, or motion of the load by combining the sensor data from the sensor suite in a non-linear filter to determine a current state.

Example 86. The apparatus according to Example 85, wherein the non-linear filter is a Kalman filter.

Example 87. The apparatus according to Example 85, further comprising means to project near-term future motion based on the current state with feedback from at least one of a functional mode or command state of an operational module, a thrust and orientation mapping, or a fan mapping.

Example 88. The apparatus according to Example 87, wherein the functional mode or command state comprises means to at least one of idle, maintain relative location or position relative to a carrier, move to a location, hold position, avoid an obstacle, or obtain direct control from a human.

Example 89. The apparatus according to Example 83, wherein the motor is a first motor, further comprising a second motor between a third unidirectional fan and a fourth unidirectional fan and further comprising means to control the first motor and the second motor to impart at least one of a horizontal thrust vector or a torque on the load.

Example 90. The apparatus according to Example 68, further comprising means to discharge heat from the motor with a heat transfer structure, wherein the heat transfer structure comprises vanes radially arrayed around the motor in a flow of thrust fluid.

Example 91. The apparatus according to Example 90, wherein the motor comprises magnets proximate to the driveshaft, windings distal to the driveshaft, and further comprising means to produce heat in the windings and means to transfer the heat in the windings to the heat transfer structure.

Example 92. The apparatus according to Example 68, further comprising means to resist a movement of at least one of the first fan or the second fan with a brake.

Example 93. The apparatus according to Example 92, further comprising means to selectively transfer torque between a first of the first unidirectional fan or the second unidirectional fan and means to arrest movement of a second of the first fan or the second fan with the brake.

Example 94. The apparatus according to Example 93, wherein the brake comprises means for at least one of a magnetic brake or a friction brake.

Example 95. The apparatus according to Example 68, wherein the selective power transfer mechanism comprises a clutch, and further comprising means to transfer torque from the motor to a first of the first fan or the second fan and means to prevent transfer of torque to a second of the first fan or the second fan with the clutch.

Example 96. The apparatus according to Example 68, wherein the selective power transfer mechanism comprises a differential transmission, and further comprising means to transfer torque from the motor to a first of the first fan or the second fan and means to prevent transfer of torque to a second of the first fan or the second fan with the differential transmission.

Example 97 One or more computer-readable media comprising instructions that cause a computer device, in response to execution of the instructions by a processor of the computer device, to: operate a motor in a first direction of rotation to transfer torque from the motor through a driveshaft and a selective power transfer mechanism to the first unidirectional fan and operate the motor in a second direction of rotation to transfer torque from the motor through the driveshaft and the selective power transfer mechanism to the second unidirectional fan and thereby selectively transfer torque from the motor between the first unidirectional fan and the second unidirectional fan.

Example 98. The computer-readable media according to Example 97, wherein the instructions further cause the processor of the computer device to operate the motor in the first direction of rotation to passively transfer torque from the motor through a driveshaft and the selective power transfer mechanism to the first unidirectional fan and operate the motor in the second direction of rotation to passively transfer torque from the motor through a driveshaft and the selective power transfer mechanism to the second unidirectional fan.

Example 99. The computer-readable media according to Example 98, wherein to passively transfer torque from the motor comprises to change torque transfer between the first unidirectional fan and the second unidirectional fan based only on the first direction of rotation and the second direction of rotation without an independently powered actuator in the selective power transfer mechanism.

Example 100. The computer-readable media according to Example 97, wherein the first unidirectional fan and the second unidirectional fan are configured to propel thrust fluid and develop thrust in opposite directions.

Example 101. The computer-readable media according to Example 97, wherein the selective power transfer mechanism comprises a first freewheel assembly between the driveshaft and the first unidirectional fan and a second freewheel assembly between the driveshaft and the second unidirectional fan.

Example 102. The computer-readable media according to Example 101, wherein the instructions further cause the processor of the computer device to engage the first freewheel assembly with the driveshaft to transfer torque from the motor to the first unidirectional fan by operating the motor in the first direction of rotation and to engage the second freewheel assembly with the driveshaft to transfer torque from the motor to the second unidirectional fan by operating the motor in the second direction of rotation.

Example 103. The computer-readable media according to Example 101, wherein the first freewheel assembly comprises a pawl and a ratchet tooth.

Example 104. The computer-readable media according to Example 103, wherein the instructions further cause the processor of the computer device to engage the pawl with the ratchet tooth by rotating the motor in the first direction.

Example 105. The computer-readable media according to Example 103, wherein the instructions further cause the processor of the computer device to disengage the pawl from the ratchet tooth by rotating the motor in the second direction.

Example 106. The computer-readable media according to Example 97, wherein the driveshaft is a double ended driveshaft, wherein the double ended driveshaft passes through a center of the motor.

Example 107. The computer-readable media according to Example 97, wherein the first unidirectional fan and the second unidirectional fan rotate about a common axis of rotation.

Example 108. The computer-readable media according to Example 97, wherein the instructions further cause the processor of the computer device to propel thrust fluid in opposing directions with the first unidirectional fan and the second unidirectional fan.

Example 109. The computer-readable media according to Example 97, wherein the first unidirectional fan and the second unidirectional fan comprise blades with an asymmetric profile.

Example 110. The computer-readable media according to Example 97, wherein the instructions further cause the processor of the computer device to draw thrust fluid for the first unidirectional fan and the second unidirectional fan into a case, wherein the case surrounds the first unidirectional fan, the second unidirectional fan, the driveshaft, and the selective power transfer mechanism.

Example 111. The computer-readable media according to Example 110, wherein the instructions further cause the processor of the computer device to draw thrust fluid for the first unidirectional fan and the second unidirectional fan into a thrust fluid inlet in the case, wherein the thrust fluid inlet is a radial inlet centrally located between the first unidirectional fan and the second unidirectional fan.

Example 112. The computer-readable media according to Example 97, wherein the instructions further cause the processor of the computer device to control the motor with a computer processor, wherein the computer processor obtains instructions from a memory, and, with the instructions, control the motor to selectively output thrust through the first unidirectional fan and the second unidirectional fan to influence a motion of a load secured to a housing, wherein the housing is secured to the computer processor, the memory, the motor, the driveshaft, the first unidirectional fan and the second unidirectional fan.

Example 113. The computer-readable media according to Example 112, wherein the instructions further cause the processor of the computer device to determine with a sensor data from a sensor suite a position, orientation, or motion of the load and control the motor to selectively output thrust through the first unidirectional fan and the second unidirectional fan according to the position, orientation, or motion to influence at least one of the position, orientation, or motion of the load.

Example 114. The computer-readable media according to Example 113, wherein the instructions further cause the processor of the computer device to determine the position, orientation, or motion of the load by combining the sensor data from the sensor suite in a non-linear filter to determine a current state.

Example 115. The computer-readable media according to Example 114, wherein the non-linear filter is a Kalman filter.

Example 116. The computer-readable media according to Example 115, wherein the instructions further cause the processor of the computer device to project near-term future motion based on the current state with feedback from at least one of a functional mode or command state of an operational module, a thrust and orientation mapping, or a fan mapping.

Example 117. The computer-readable media according to Example 116, wherein the functional mode or command state comprises at least one of idle, maintain relative location or position relative to a carrier, move to a location, hold position, obstacle avoidance, or direct control.

Example 118. The computer-readable media according to Example 112, wherein the motor is a first motor, further comprising a second motor between a third unidirectional fan and a fourth unidirectional fan and wherein the instructions further cause the processor of the computer device to control the first motor and the second motor to impart at least one of a horizontal thrust vector or a torque on the load.

Example 119. The computer-readable media according to Example 97, wherein the motor comprises a heat transfer structure, wherein the heat transfer structure comprises vanes radially arrayed around the motor in a flow of thrust fluid.

Example 120. The computer-readable media according to Example 119, wherein the motor comprises magnets proximate to the driveshaft, windings distal to the driveshaft, and wherein the heat transfer structure transfers heat produced in the windings to the flow of thrust fluid.

Example 121. The computer-readable media according to Example 97, wherein the instructions further cause the processor of the computer device to resist a movement of at least one of the first fan or the second fan with a brake.

Example 122. The computer-readable media according to Example 121, wherein the instructions further cause the processor of the computer device to selectively transferring torque between a first of the first unidirectional fan or the second unidirectional fan and to arrest movement of a second of the first fan or the second fan with the brake.

Example 123. The computer-readable media according to Example 122, wherein the brake comprises at least one of a magnetic brake or a friction brake.

Example 124. The computer-readable media according to Example 97, wherein the selective power transfer mechanism comprises a clutch, and wherein the instructions further cause the processor of the computer device to transferring torque from the motor to a first of the first fan or the second fan and to prevent transfer of torque to a second of the first fan or the second fan with the clutch.

Example 125. The computer-readable media according to Example 97, wherein the selective power transfer mechanism comprises a differential transmission, and wherein the instructions further cause the processor of the computer device to transfer torque from the motor to a first of the first fan or the second fan and to prevent transfer of torque to a second of the first fan or the second fan with the differential transmission.

The invention claimed is:

1. A suspended load control system to control a load suspended on a suspension cable beneath a carrier comprising:
    a bidirectional thrust assembly comprising a motor, a driveshaft, a first fan and a second fan, wherein the first fan and the second fan are configured to propel thrust fluid and develop thrust in opposite directions, and wherein the motor is to transfer torque from the motor through the driveshaft to either the first fan or the second fan;
    further comprising a sensor suite and a computer processor and memory, wherein the memory comprises a thrust control module which, when executed by the computer processor, is to determine a position, orientation, or motion of the suspended load control system based on a sensor data from the sensor suite by combining the sensor data from the sensor suite in a filter to determine a current state and is to control the motor to selectively output thrust from the first fan or the second fan and is to thereby impart a horizontal thrust vector or a torque on the suspended load control system to thereby influence at least one of the position, orientation, or motion of the suspended load control system, wherein the thrust control module further is to project future motion based on the current state with feedback from at least one of a functional mode or command state, a thrust and orientation mapping, or a fan mapping.

2. The suspended load control system according to claim 1, wherein to control the motor to selectively output thrust from the first fan or the second fan, the thrust control module is to operate the motor in a first direction of rotation or a second direction of rotation, wherein the first direction of rotation is to cause the motor to transfer torque from the motor to the first fan and not the second fan and wherein the second direction of rotation is to cause the motor to transfer torque from the motor to the second fan and not the first fan.

3. The suspended load control system according to claim 1, wherein a first freewheel assembly is to transfer torque between the driveshaft and the first fan and a second freewheel assembly is to transfer torque between the driveshaft and the second fan.

4. The suspended load control system according to claim 3, wherein the first freewheel assembly and the second freewheel assembly are to engage or disengage with the driveshaft based on a direction of rotation of the motor to cause the motor to transfer torque from the motor to either the first fan or the second fan.

5. The suspended load control system according to claim 3, wherein the first freewheel assembly comprises a pawl and a ratchet tooth, wherein the pawl is to selectively engage with the ratchet tooth in response to a rotation of the motor in a first direction of rotation and wherein the pawl is to selectively disengage with the ratchet tooth in response to a rotation of the motor in a second direction of rotation.

6. The suspended load control system according to claim 1, wherein the driveshaft is to engage with a differential transmission, wherein the differential transmission is to selectively transfer torque from the motor through the driveshaft to either the first fan or the second fan.

7. The suspended load control system according to claim 1, wherein the driveshaft is to engage with the first fan via a first clutch and is to engage with the second fan via a second clutch, wherein the first clutch and the second clutch are to selectively allow the first fan or the second fan to transfer torque from the motor through the driveshaft to either the first fan or the second fan.

8. The suspended load control system according to claim 1, wherein the bidirectional thrust assembly is a first bidirectional thrust assembly, and wherein the first bidirectional thrust assembly and a second bidirectional thrust assembly are parallel to one another, horizontal to a normal gravitational field, and at distal ends of the suspended load control system.

9. The suspended load control system according to claim 1, wherein the motor comprises a heat transfer structure, wherein the heat transfer structure is radially arrayed around the motor in a flow of thrust fluid, wherein the motor comprises magnets proximate to the driveshaft, windings distal to the driveshaft, and wherein heat produced in the windings is to transfer to the heat transfer structure and to the flow of thrust fluid surrounding the motor.

10. The suspended load control system according to claim 1, further comprising a brake, wherein the motor is to transfer torque from the motor to a first of the first fan or the second fan and the brake is to arrest movement of a second of the first fan or the second fan.

11. A method to influence at least one of a position, orientation, or motion of a suspended load control system on a suspension cable beneath a carrier comprising:
  obtaining a sensor data from a sensor suite;
  combining the sensor data from the sensor suite in a filter to determine a current state comprising a position, orientation, or motion of the suspended load control system;
  in response to the current state comprising the position, orientation, or motion of the suspended load control system, selectively operating a motor in a first direction of rotation to transfer torque from the motor through a driveshaft to a first unidirectional fan and selectively operating the motor in a second direction of rotation to transfer torque from the motor through the driveshaft to a second unidirectional fan;
  and thereby imparting a horizontal thrust vector or a torque on the suspended load control system and influence at least one of the position, orientation, or motion of the suspended load control system; and further comprising projecting a future motion based on the current state with feedback from at least one of a functional mode or command state, a thrust and orientation mapping, or a fan mapping, and further comprising in response to the current state and the future motion, selectively operating the motor in the first direction of rotation to transfer torque from the motor through the driveshaft to the first unidirectional fan and selectively operating the motor in the second direction of rotation to transfer torque from the motor through the driveshaft to the second unidirectional fan.

12. The method according to claim 11, wherein to transfer torque from the motor through the driveshaft comprises operating the motor in the first direction of rotation to engage a first freewheel assembly with the driveshaft to transfer torque from the motor to the first unidirectional fan and operating the motor in the second direction of rotation to engage a second freewheel assembly with the driveshaft to transfer torque from the motor to the second unidirectional fan.

13. The method according to claim 11, wherein the motor is a first motor and the driveshaft is a first driveshaft and further comprising selectively operating a second motor in the first direction of rotation to transfer torque from the second motor through a second driveshaft to a third unidirectional fan and selectively operating the second motor in the second direction of rotation to transfer torque from the second motor through the second driveshaft to a fourth unidirectional fan.

14. The method according to claim 11, further comprising a heat transfer structure radially arrayed around the motor in a flow of thrust fluid, wherein the motor comprises magnets proximate to the driveshaft, windings distal to the driveshaft, and wherein selectively operating the motor in the first direction of rotation to transfer torque from the motor through the driveshaft to the first unidirectional fan and selectively operating the motor in the second direction of rotation to transfer torque from the motor through the driveshaft to the second unidirectional fan further comprises producing a heat in the windings and wherein the method further comprises transferring the heat in the windings to the heat transfer structure.

15. An apparatus to control a load suspended on a suspension cable beneath a carrier comprising:
  means to obtain a sensor data from a sensor suite;
  means to combine the sensor data from the sensor suite in a filter to determine a current state comprising a position, orientation, and motion of the apparatus;
  in response to the determined current state comprising the position, orientation, and motion of the apparatus, means to impart a horizontal thrust vector or a torque on the apparatus to influence at least one of the position, orientation, or motion of the apparatus, wherein the means to impart the horizontal thrust vector or the torque on the apparatus further comprises means to operate a first motor in a first direction of rotation to transfer torque from the first motor through a driveshaft to a first unidirectional fan and means to operate the motor in a second direction of rotation to transfer torque from the motor through the driveshaft to the second unidirectional fan and to thereby selectively output thrust from the first unidirectional fan and the second unidirectional fan; comprising means to project a future motion based on the current state with feedback from at least one of a functional mode or command state, a thrust and orientation mapping, or a fan mapping, and further comprising in response to the current state, the projected future motion, and feedback from at least one of the functional mode or command state, and the thrust and orientation mapping, means to selectively operate the motor in the first direction of rotation to transfer torque from the motor through the driveshaft to the first unidirectional fan and means to selectively operate the motor in the second direction of rotation to transfer torque from the motor through the driveshaft to the second unidirectional fan.

16. The apparatus according to claim 15, further comprising means for a first freewheel assembly between the driveshaft and the first unidirectional fan and a second freewheel assembly between the driveshaft and the second unidirectional fan, wherein the means for the first freewheel assembly comprises means to engage with the driveshaft to transfer torque from the first motor to the first unidirectional fan when the first motor is operated in the first direction of rotation and the second freewheel assembly comprises means to engage with the driveshaft to transfer torque from the first motor to the second unidirectional fan when the first motor is operated in the second direction of rotation.

17. The apparatus according to claim 15, further comprising means to resist a movement of at least one of the first unidirectional fan or the second unidirectional fan with a brake.

* * * * *